United States Patent
Gadiyar et al.

(10) Patent No.: US 12,493,952 B2
(45) Date of Patent: Dec. 9, 2025

(54) COMPUTER-IMPLEMENTED DETECTION AND PROCESSING OF ORAL FEATURES

(71) Applicant: ORAL TECH AI PTY LTD, Sandgate (AU)

(72) Inventors: Padma Gadiyar, Brisbane (AU); Praveen Narra, San Jose, CA (US); Anand Selvadurai, Tamil Nadu (IN); Radeeshwar Reddy, Andhra Pradesh (IN); Sai Ainala, Andhra Pradesh (IN); Hemadri Babu Jogi, Andhra Pradesh (IN)

(*) Notice: Subject to any disclaimer, the term of this patent is extended or adjusted under 35 U.S.C. 154(b) by 482 days.

(21) Appl. No.: 18/002,622

(22) PCT Filed: Jun. 23, 2021

(86) PCT No.: PCT/IB2021/055550
§ 371 (c)(1),
(2) Date: Dec. 20, 2022

(87) PCT Pub. No.: WO2021/260581
PCT Pub. Date: Dec. 30, 2021

(65) Prior Publication Data
US 2023/0237650 A1    Jul. 27, 2023

Related U.S. Application Data

(60) Provisional application No. 63/043,147, filed on Jun. 24, 2020.

(51) Int. Cl.
*G06K 9/00* (2022.01)
*A61B 5/00* (2006.01)
(Continued)

(52) U.S. Cl.
CPC .......... *G06T 7/0012* (2013.01); *A61B 5/0088* (2013.01); *A61B 5/7275* (2013.01);
(Continued)

(58) Field of Classification Search
CPC ......... G06T 7/0012; G06T 2207/20081; G06T 2207/30036; G06T 2207/10024;
(Continued)

(56) References Cited

U.S. PATENT DOCUMENTS 10,460,839 B1    10/2019    Ricci
10,617,294 B1    4/2020    Krishna et al.
(Continued)

FOREIGN PATENT DOCUMENTS

CN    112037913 A    * 12/2020    ............. G06N 3/045
JP    2010224706 A    10/2010
(Continued)

OTHER PUBLICATIONS

International Preliminary Report on Patentability dated Dec. 13, 2022 re PCT/IB2021/055048 (9 pages).
(Continued)

*Primary Examiner* — Xin Jia
(74) *Attorney, Agent, or Firm* — Aurora Consulting; Albert Du; Ashley Sloat

(57) ABSTRACT

Described herein are computer-implemented methods for analyzing an input image of a mouth region from a user to provide information regarding a disease or condition of the mouth region, a computing device configured to receive the input images from a user; and a trained machine learning system. In some embodiments, the computing device is configured to transmit an oral health score to the user.

27 Claims, 19 Drawing Sheets

(51) Int. Cl.
  *G06N 3/0464* (2023.01)
  *G06N 3/0985* (2023.01)
  *G06N 3/10* (2006.01)
  *G06T 7/00* (2017.01)
  *G16H 50/30* (2018.01)

(52) U.S. Cl.
  CPC ......... *G06N 3/0464* (2023.01); *G06N 3/0985* (2023.01); *G06N 3/10* (2013.01); *G16H 50/30* (2018.01); *G06T 2207/20081* (2013.01); *G06T 2207/30036* (2013.01)

(58) Field of Classification Search
  CPC ......... G06T 2207/20084; G06T 7/0014; A61B 5/0088; A61B 5/7275; A61B 2576/02; A61B 5/4547; A61B 5/4552; G06N 3/0464; G06N 3/0985; G06N 3/10; G06N 3/045; G06N 3/048; G06N 3/08; G16H 50/30; G16H 10/20; G16H 80/00; G16H 30/40; G16H 50/20
  See application file for complete search history.

(56) References Cited

U.S. PATENT DOCUMENTS

| | | | |
|---|---|---|---|
| 11,049,606 B2 * | 6/2021 | Johnson | ............... A61C 9/0046 |
| 2003/0065255 A1 | 4/2003 | Giacchetti et al. | |
| 2004/0146194 A1 | 7/2004 | Ichikawa et al. | |
| 2013/0251219 A1 | 9/2013 | Mehta | |
| 2014/0037180 A1 | 2/2014 | Wang et al. | |
| 2019/0290400 A1 | 9/2019 | Stone-Collonge et al. | |
| 2019/0325200 A1 | 10/2019 | Qian et al. | |
| 2019/0333627 A1 | 10/2019 | Johnson | |
| 2020/0074678 A1 | 3/2020 | Ning et al. | |
| 2020/0218924 A1 | 7/2020 | Tiwari et al. | |
| 2020/0364860 A1 * | 11/2020 | Kearney | ............... G16H 30/40 |

FOREIGN PATENT DOCUMENTS

| | | | |
|---|---|---|---|
| KR | 1020170098386 A | 8/2017 | |
| KR | 1020190092699 A | 8/2019 | |
| KR | 102240932 B1 | 4/2021 | |
| WO | WO-2020080819 A1 * | 4/2020 | ........... G06T 7/0012 |

OTHER PUBLICATIONS

International Preliminary Report on Patentability dated Dec. 13, 2022 re PCT/IB2021/055550 (7 pages).
International Search Report dated Sep. 9, 2021 re PCT/IB2021/055048 (3 pages).
International Search Report dated Sep. 29, 2021 re PCT/IB2021/055550 (4 pages).
Written Opinion dated Sep. 9, 2021 re PCT/IB2021/055048 (8 pages).
Written Opinion dated Sep. 29, 2021 re PCT/IB2021/055550 (6 pages).

* cited by examiner

- Input: $(N, C_{in}, H_{in}, W_{in})$
- Output: $(N, C_{out}, H_{out}, W_{out})$ where $$H_{out} = \left\lfloor \frac{H_{in} + 2 \times \text{padding}[0] - \text{dilation}[0] \times (\text{kernel\_size}[0] - 1) - 1}{\text{stride}[0]} + 1 \right\rfloor$$

$$W_{out} = \left\lfloor \frac{W_{in} + 2 \times \text{padding}[1] - \text{dilation}[1] \times (\text{kernel\_size}[1] - 1) - 1}{\text{stride}[1]} + 1 \right\rfloor$$

FIG. 6

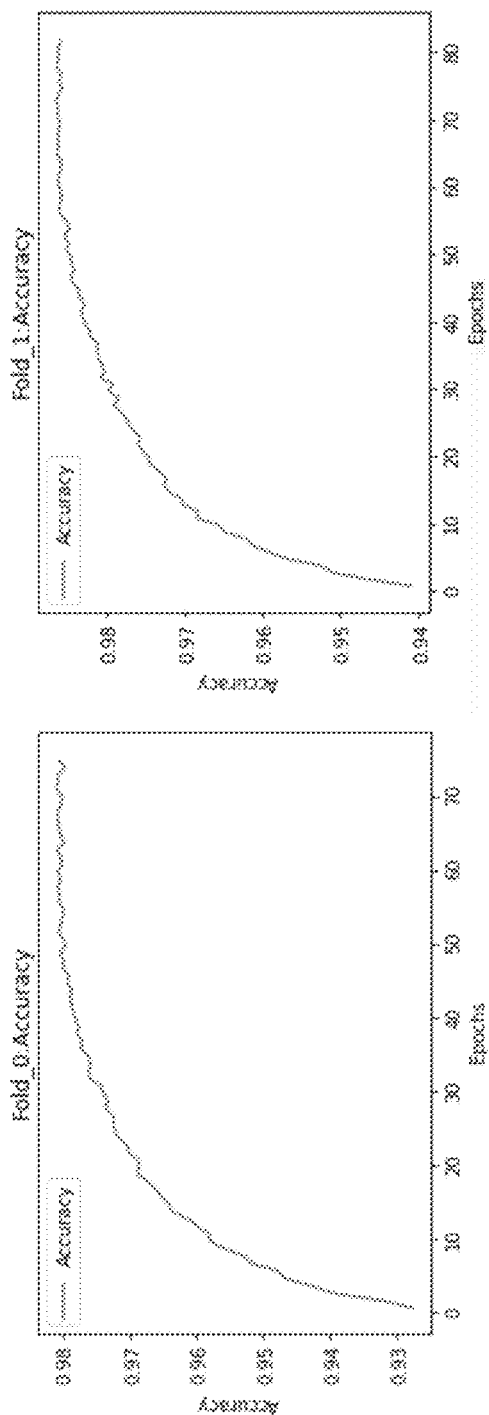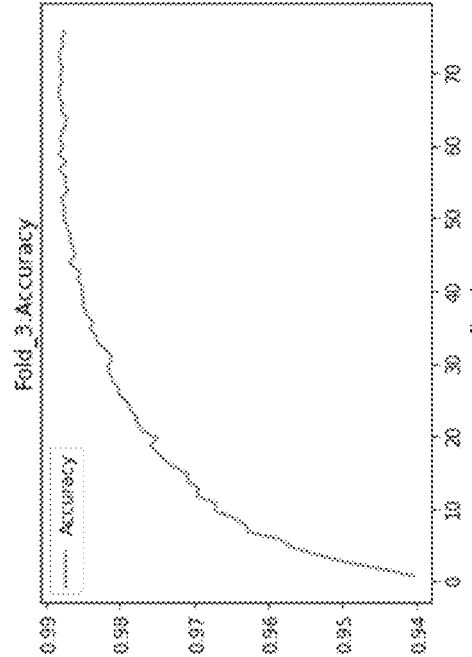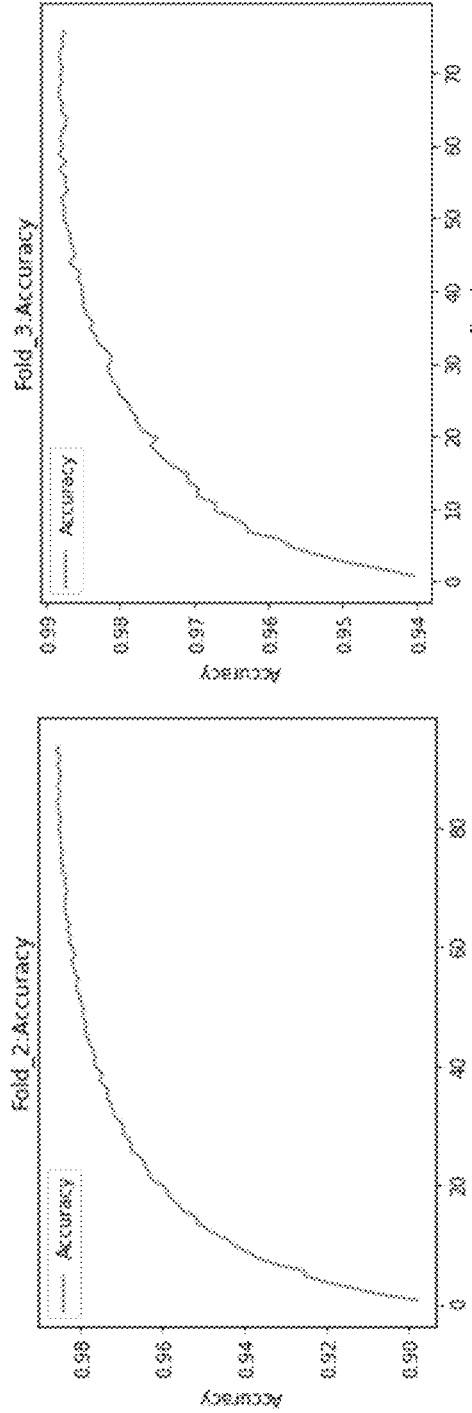
FIG. 9A
FIG. 9B
FIG. 9C
FIG. 9D

COMPUTER-IMPLEMENTED DETECTION AND PROCESSING OF ORAL FEATURES

CROSS-REFERENCE TO RELATED APPLICATIONS

This application is a 35 U.S.C. 371 National Stage filing for PCT Application Ser. No. PCT/IB2021/055550, filed Jun. 23, 2021, now published as WO 2021260581, which claims the priority benefit of U.S. Provisional Patent Application Ser. No. 63/043,147, filed Jun. 24, 2020, the contents of each of which are herein incorporated by reference in their entireties.

TECHNICAL FIELD

This disclosure relates generally to systems and methods to the field of machine learning for the analysis of images, and more specifically to the field of automated image analyzing and processing.

BACKGROUND

Early detection of dental problems, such as dental caries and periodontitis, remains the most effective way to prevent major dental problems in the future. Minor dental problems are easily resolved saving patients time and money. Patients delay making appointments with dentists for many reasons, such as living far away from their dentist or not having available time for a wellness check. Since some patients cannot visibly see any dental problems or they are not experiencing any dental pain, they may mistakenly believe that there are no problems. However, in the early stages of dental caries and periodontitis, there may not be any visible identification or pain. It is crucial, though, to catch these types of problems in the early stage to stop their worsening progression.

What is needed, therefore, is a readily available detection system and method that provides patients access to a user-friendly tool that will analyze and provide a diagnosis of any dental problems based on user images of the teeth and gum areas, without requiring an actual visit to a dentist.

BRIEF DESCRIPTION OF THE DRAWINGS

The aspects, features, and advantages of the present technology are described below in connection with various embodiments, with reference made to the accompanying drawings.

FIG. 6 illustrates a mathematical equation that may be used in the neural network system for processing any of the input images to generate the desired output features.

FIGS. 9A-9D illustrate plots showing an example of an accuracy for the training and validation at each fold.

Figure 1A:
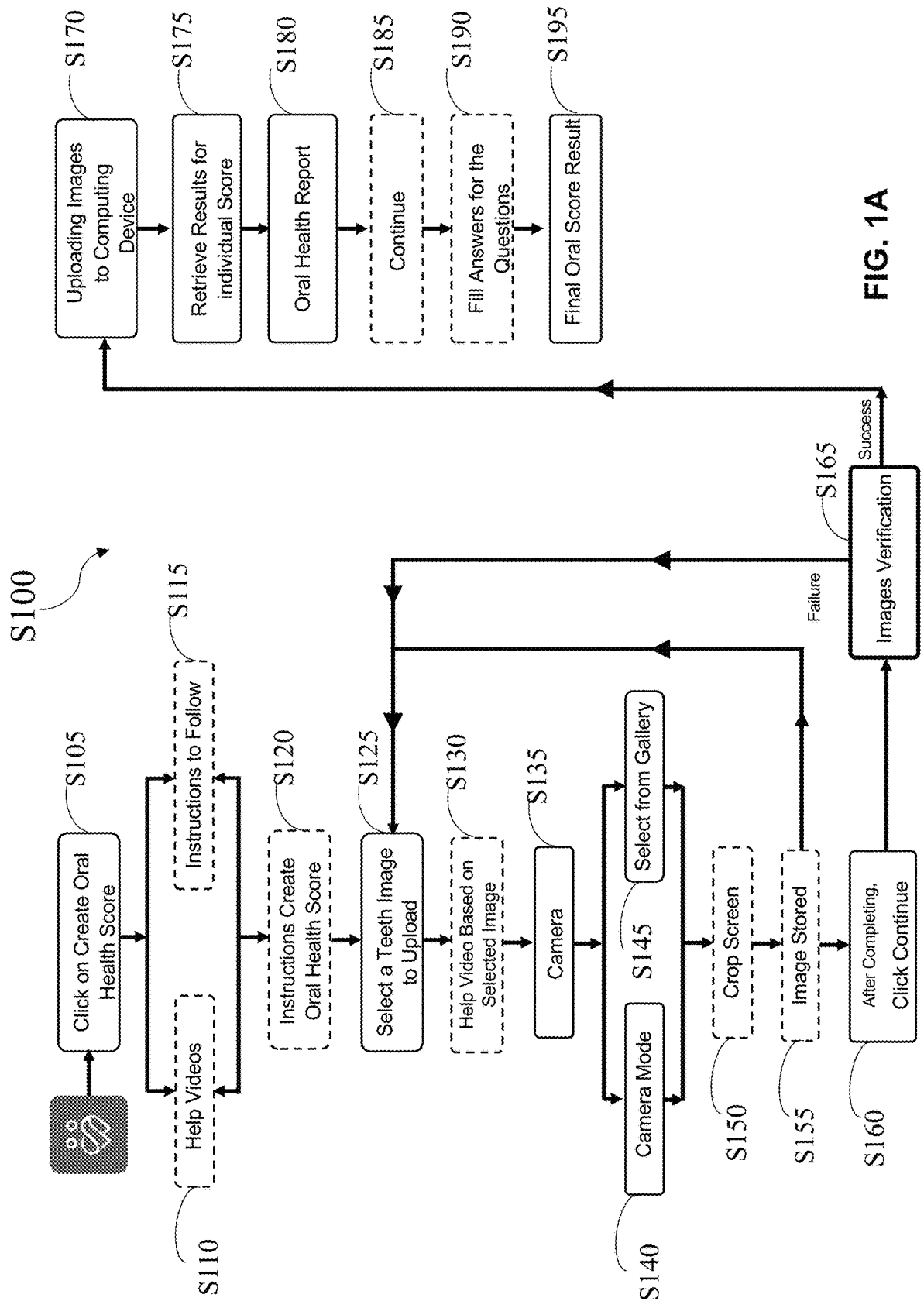
FIG. 1A is a flowchart of an overview of one embodiment of an oral detection application that is implemented on a computing device.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

The present invention provides systems and methods for analyzing and predicting the presence of a disease or condition of the mouth region. The system is directed to a machine learning system that is trained to analyze images and predict the presence or absence of dental conditions or diseases without human intervention. In some embodiments, the machine learning system may be used by users and/or their providers as a tool for early detection of any conditions or diseases. In some embodiments, the machine learning system may be trained to predict a severity or stage of severity of a condition or disease. Further, the machine learning system may be trained to analyze an image and predict the presence or absence of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, (including but not limited to: anodontia, hyperdontia, hypodontia, microdontia, macrodontia, cleft lip/palate), tongue disease, one or more cosmetic conditions, (including but not limited to: missing teeth, teeth discoloration, crooked teeth), etc.

Further, the system is used to allow a user to capture an image of their mouth and transmit the image to a trained system. The trained system may reside on the local computing device or on a remote computing device (e.g., server). In some embodiments, the system functions to also provide users with a personalized oral health score based on the analyzed image. For example, the systems and methods described herein may function to identify and/or provide the oral health score based one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, (including but not limited to: anodontia, hyperdontia, hypodontia, microdontia, macrodontia, cleft lip/palate), tongue disease, one or more cosmetic conditions, (including but not limited to: missing teeth, teeth discoloration, crooked teeth), etc. The system can be configured and/or adapted to function for any other suitable purpose, such as providing recommendations for dentists, hygiene habits, an oral care schedule, oral care, etc.

Any of the methods described herein may be performed locally on a user computing device (e.g., mobile device, smartphone, laptop, desktop computer, workstation, wearable, etc.) or remotely (e.g., server, remote computing device, in the "cloud", etc.).

Figure 1B:
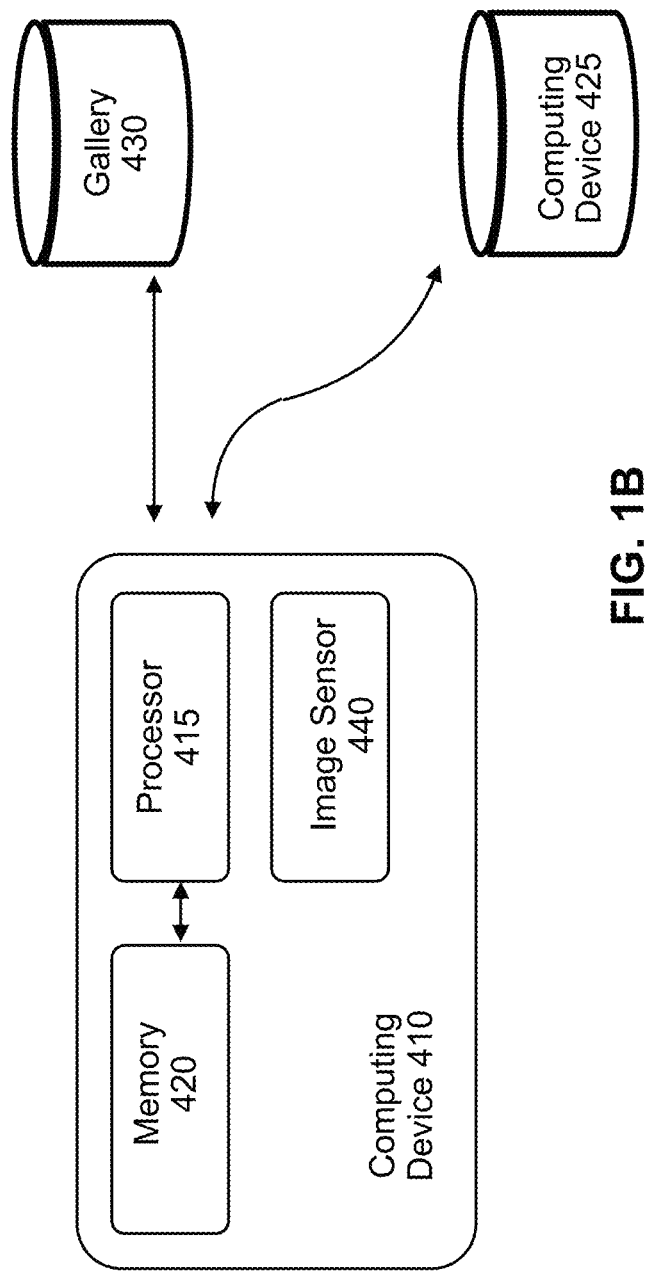
FIG. 1B is a flow chart of an overview of one embodiment of a system for detecting and processing oral features.

FIG. 1A, in conjunction with FIG. 1B, shows a flowchart S100 of an overview of one embodiment of the present invention that may be implemented on a computing device 410 using a processor 415, memory 420, and a software application. It will be appreciated that a user can download the application to run on the computing device 410 or, alternatively, the computing device 410 may access the application through a website and interact with the application residing on a remote computing device 425. The user initiates the application through a graphical user interface (GUI), and the application is launched. In an exemplary embodiment of the present invention, the application is configured for interaction with a user to create a personalized oral health score, at block S105. At blocks S110 and S115, the application is optionally configured to provide help videos and instructions that the user may need in order to get an accurate oral health score, and at block S120, optional instructions regarding creating the oral health score are provided. This help information may be provided only one-time, until the user opts out, on-demand, etc. At block S125, the application prompts the user to select and/or provide a teeth image. For example, the application may provide several different regions of the inner and outer mouth area for the user to select, such as an outer front view, an outer right view, an outer left view, an internal upper jaw, or an internal lower jaw of the teeth. Optionally, a help video or written or auditory instructions may be presented based on the selected teeth image at block S130. The help video and/or instructions may provide details on how to configure an image sensor 440 (e.g., a camera), where to distance the camera, particular angles of the camera, or lighting, among other recommendations. Additionally, guidelines, frames, points, geometric shapes, or combinations thereof, may be provided to assist the user in capturing accurate and/or clear images of the various teeth regions, and is discussed further below. Depending on the user-selected mouth region, the user selects a camera icon associated with the selected mouth region at block S135. It will be appreciated that the image sensor 440 may be integral to the overall system, such as a camera in a mobile phone, laptop, or computer, or the camera 440 may be a separate device that is capable of sending or uploading images to an external processor and memory. In this manner, the application may provide options for receiving an image, for example, one option may be a camera mode using the image sensor 440 at block S140 or another option may be a gallery, library, or database mode for selecting images stored in the gallery 430 at S145. More specifically, the user may choose to take an image at that time with the image sensor 440 or, alternatively, select an image from stored images in the gallery 430 that were taken previously by either the image sensor 440 or a separate camera (not shown). In some embodiments, the application optionally provides an option for the user to crop the input image displayed on the screen at block S150 in order to focus on the area of the desired mouth region, and optionally save the input image at block S155 to a local memory 420 or remote memory, such as the gallery 430. The user may continue to capture additional teeth images of different regions of the mouth or upload additional images by returning to block S125. Once complete, the application prompts the user to continue the application processing at block S160, and the one or more images are verified by the application at block S165. It will be appreciated that the computing device 425 may also remotely verify the images. If there are any errors, the application returns to block S125 prompting the user to retake the images.

Still referring to FIGS. 1A-1B, at block S170, the application uploads one or more images to the remote trained computing device 425. It will be appreciated that the trained computing device 425 may also reside on a personal computing device (not shown). In an exemplary embodiment of the present invention, the trained computing device 425 is a machine-learning system that is trained to analyze the received images, and provide the results for an individual score at block S175, and is discussed in detail further below. The application provides the user an oral health report for each of the images that were uploaded at block S180. The application may, optionally, prompt the user to continue with the application at block S185. If the user desires to continue, at block S190, the application optionally presents one or more health and/or personal questions that the user may elect to answer. Once complete, the application provides the user with a final oral score result at block S195.

Figure 2:
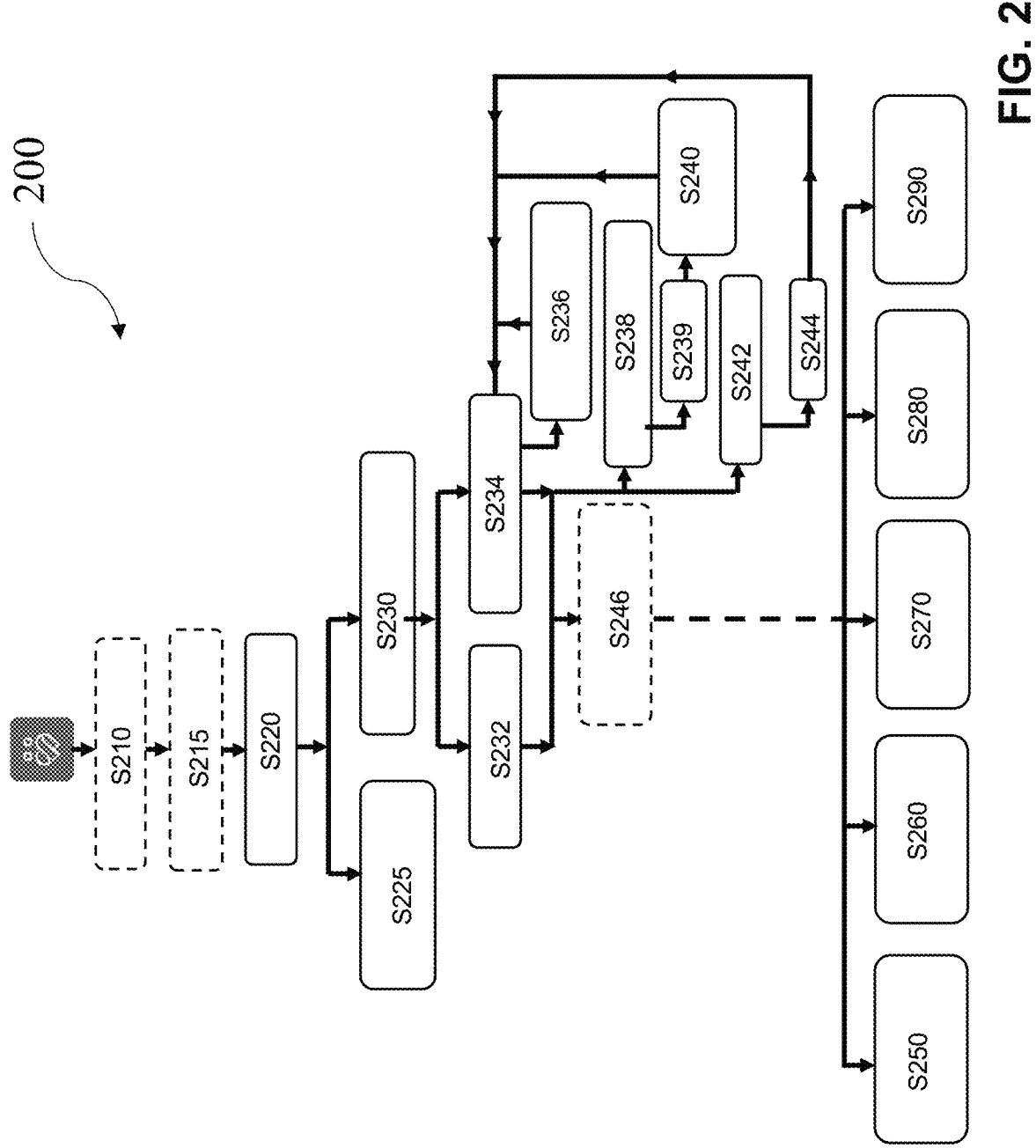
FIG. 2 shows a flowchart of an embodiment of a software application used in an oral health environment.

FIG. 2 shows a flowchart 200 of an embodiment of the software application used in an oral health environment. When the application is initialized, an introductory splash screen may optionally be presented at block S210 identifying the application, and an onboarding screen is optionally displayed at block S215. At block S220, the application prompts the user to select from one or more user roles that are each linked to appropriate modules. For example, a user may select a doctor login module at block S225 or a patient login module at block S230. If the user is a patient, the application requires login credentials from the user. At block S232, the application is configured to accept credentials associated with a user's social media account, such as a Google® or Facebook®, or at block S234, the user may sign in using an email account. It will be appreciated that the user may also sign in using a sign-in name or any equivalents thereof. At block S236, if the application recognizes that the user does not have a current registered account or the account is not activated, the application may return to blocks S232 or S234 to prompt a user to sign up for access to the software application at block S242 by providing the user a one-time password (OTP) at block S244 and enter a password at block S234. Further, if the user has forgotten their password at block S238, the application may provide a one-time password (OTP) at block S239, prompt the user to create a new password at block S240, and resend the user to block S234 to enter the new password. In some embodiments, the application may optionally prompt the user to allow push notifications at block S246.

Once the user has successfully signed into the application, the graphical user interface (GUI) provides the user with one or more application module options for selection. Some example modules may include, but are not limited to: an oral health score at block S250, a design my smile at block S260, awareness at block S270, reminders at block S280, or a menu at block S290.

Figure 3:
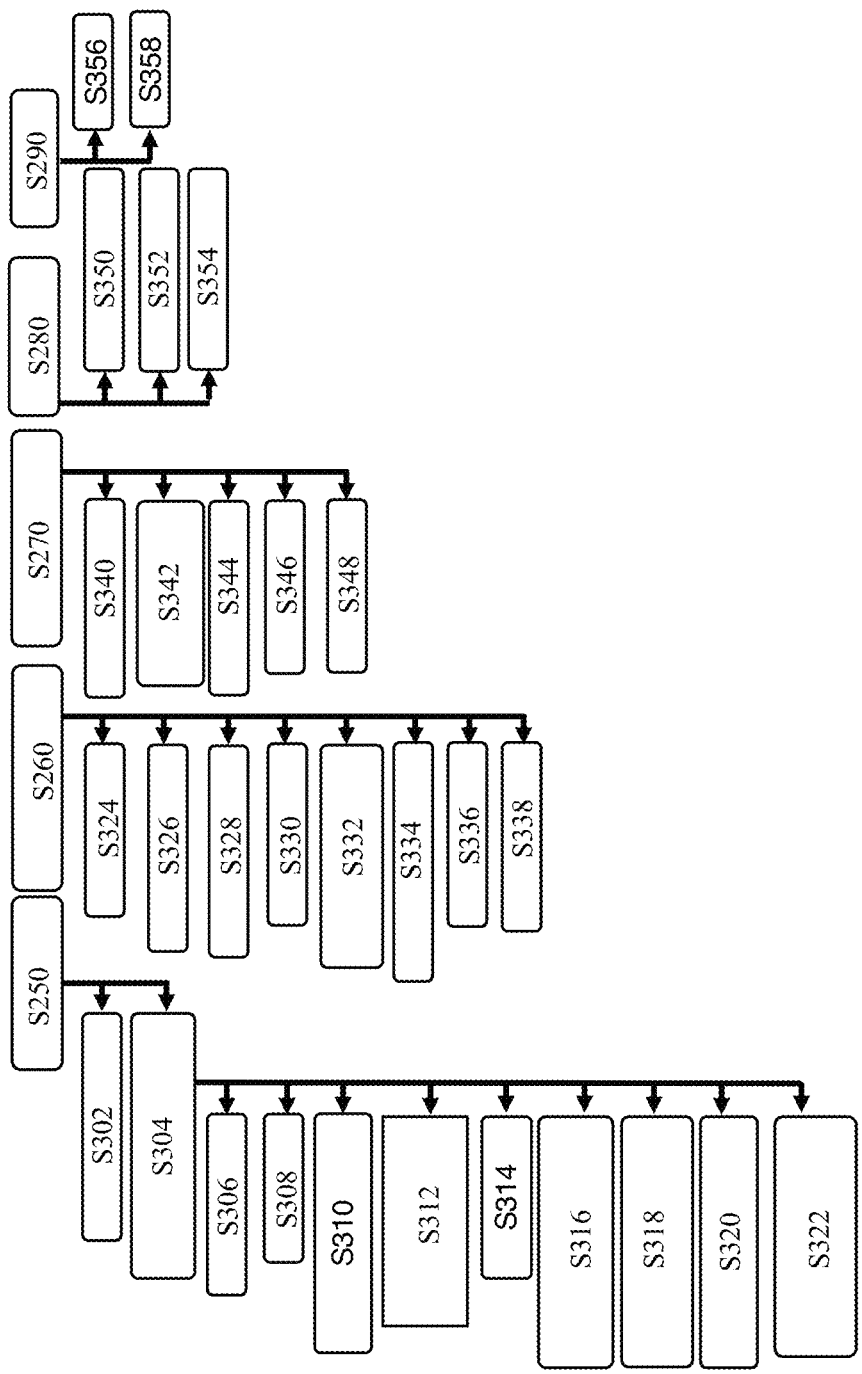
FIG. 3 shows a flowchart of an embodiment of various application modules of the software application used in a health environment.

FIG. 3 shows an illustration of an embodiment of an overview of the different application modules of the software application used in a health environment. If the user selects an oral score at block S250, as previously discussed herein, the application interacts with the user to formulate an overall oral health report (e.g., based on one or more of: health, dental history, current dental image analysis, etc.). Advantageously, the application helps guide the user towards appropriate hygiene choices. More specifically, the application initially interacts with the user to provide introductory videos at block S302, instructional videos at block S308, help videos at block S306, instructions on how to use the oral health score report at block S304, and receive teeth images of the user, e.g., from the camera 140 or a stored image at block S310. The image may be optionally cropped or processed, for example using one or more filters or tools in an editing application. After analyzing the uploaded image at block S312, the application provides the oral health report at block S314. In a preferred embodiment, the application interacts with the trained computing device 425 that utilizes one or more trained machine learning models to analyze the image of the user's teeth and/or gums. In this manner, the trained computing device 425 is configured to predict the probability of a presence or absence of dental caries, periodontitis, an impacted tooth or teeth, hyperdontia, gingivitis, oral cancer, abscessed tooth or teeth, bleeding gums, or other oral health conditions or oral diseases. The report provides the user with an oral health rating or score that the user can then use to decide to schedule an appointment with a dentist or periodontist. Further, the application may optionally present questions related to the user's hygiene. For example, the user is asked one or more oral hygiene questions at blocks S316 or follow-up questions (e.g., based on answers to questions at block S316) at block S318. In one embodiment based on their answers, the application displays how the answers are ranked (e.g., ranking guidelines) at block S320 and provides an overall oral health score report at block S322.

The user may also select the design my smile module at block S260. The application provides an introduction at block S324 for this module of the software and initializes a camera mode at block S326. Alternatively, the user may select to load an input image from an image library or gallery at block S328. The application may optionally crop the input image to reflect a subset region of the input image for designing at block S330. For example, the user may want to design his smile and teeth, and the input image is cropped to display that region. It will be appreciated, however, that while the drawing reflects a smile, the software application can accommodate any other dental or oral feature, such as the user's lips, gums, teeth, tongue, etc. The application analyzes the input image at block S332 and interacts with the user to alter, adjust, and/or enhance his smile at block S334, and the altered customized image is saved at block S338. If there are any input image errors at block S336, the user is notified.

The user may select the awareness module at block S270 when the user is interested in educational information. The educational awareness materials may include, but not be limited to, recent articles (e.g., on health topics, sleep habits, dental care habits, etc.) at block S340, rankings of most-liked articles at block S342, article details at block S344, etc. The user may be able to share those articles by liking them or sharing them with others at blocks S346, S348.

Further, the user may select the reminders modules at block S280. The application is configured to allow a user to program a reminders list at block S350 by adding at block S352 and/or editing reminders at block S354. These reminders can be related to any health reminder, such as timers for brushing their teeth, visiting a dentist, reminders to floss, reminders to not chew nails or ice, for example.

Additionally, the user may select the menu module at block S290 where the application allows the user to update and/or complete their user profile at block S356 including any personal, medical, and/or lifestyle information. The user may set their password and other account information. There are various forums presented in which the user may participate at block S358. The user may be able to view all posts, his/her posts, search posts, add new posts, post details, add comments, like posts, share posts, etc. Further, there may be other information stored that is related to the software application and its use.

Figure 4:
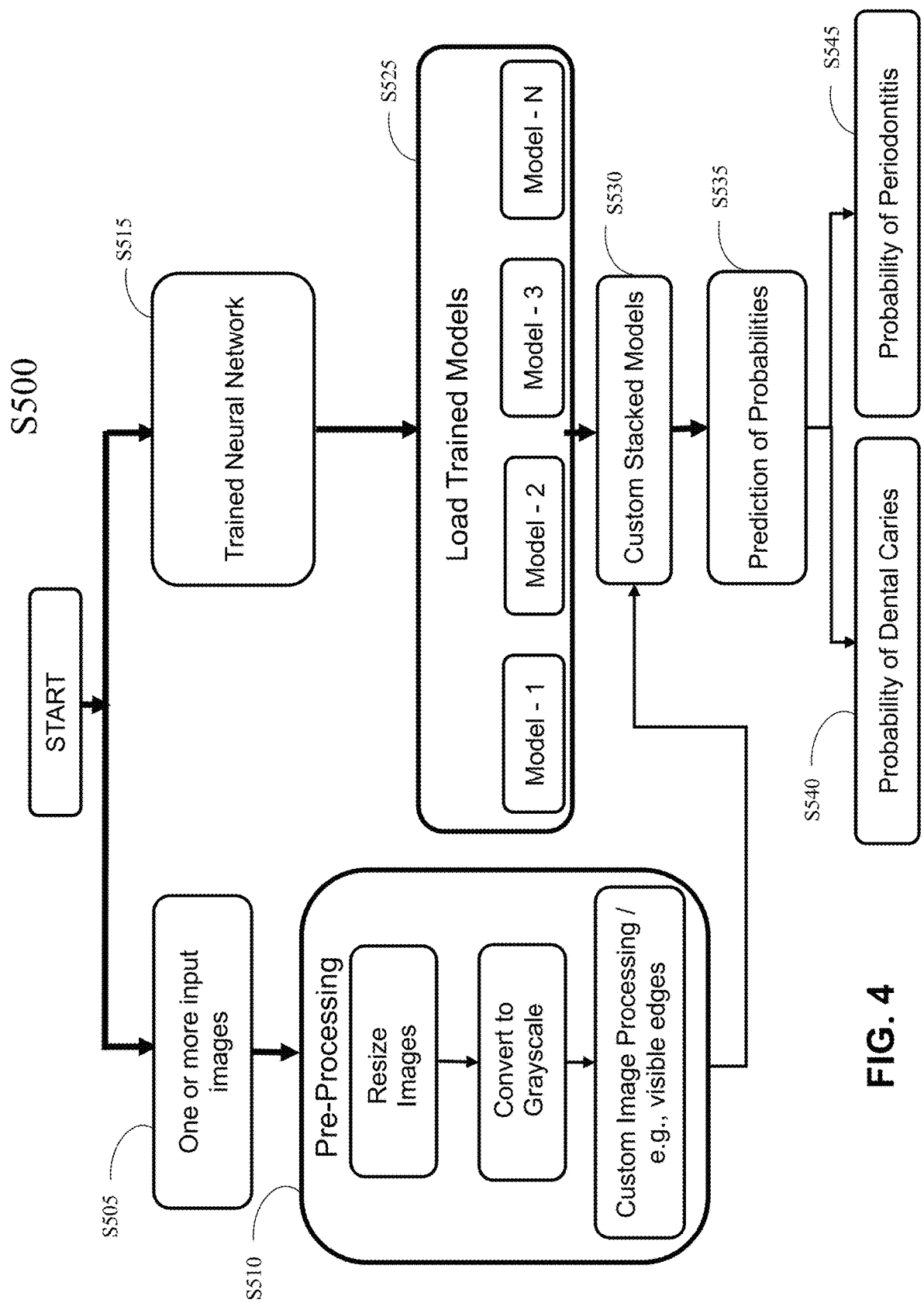
FIG. 4 shows a flowchart of an embodiment of a trained machine learning system.

FIG. 4 shows a flowchart S500 of an embodiment of the trained machine learning system operations. The computing device 425 receives one or more uploaded input images at block S505, and the computing device 425 may begin a pre-processing application at block S510. The pre-processing of the input images may depend on one or more characteristics of the system architecture, hyper-parameters, characteristics, such as a shape, resolution, etc., of the images of the training dataset, to name but a few. A variety of frameworks may be used for the pre-processing. In one embodiment, a machine learning library may be used (e.g., PyTorch®). The machine learning library requires a variable in tensors with the dependent and independent features converting to float values while training the computing device 425. If using the Pytorch® framework, one or more images may be converted to a format suitable for the Pytorch® framework. Another embodiment may use TensorFlow®, which is another open source machine learning library. Multi-dimensional array formats are used for training. In this embodiment, the one or more input images may be converted to a tensor-of-arrays format that is suitable for the framework. The pre-processing framework may resize the input images by changing the resolution to a value ranging between about 32×32 to about 2048×2048 pixels per inch. In an embodiment of the present invention, the images are resized to a rectangular 350×250 pixels per inch resolution. In this manner, the desired features are efficiently extracted. The input images received are generally 3-channel, or RGB, images. Alternatively, or additionally, YCbCr, YUV, CMYK, HSV, HSL, LCh color spaces may be used. In accordance with the present invention, the pre-processing converts the 3-channel images to 1-channel, or greyscale, images by using a computer vision library (e.g., OpenCV). Further pre-processing may include introducing a Gaussian blur to make the features of the image more visible and highlighting one or more edges on the input images to identify fine details of the features.

Figure 5A:
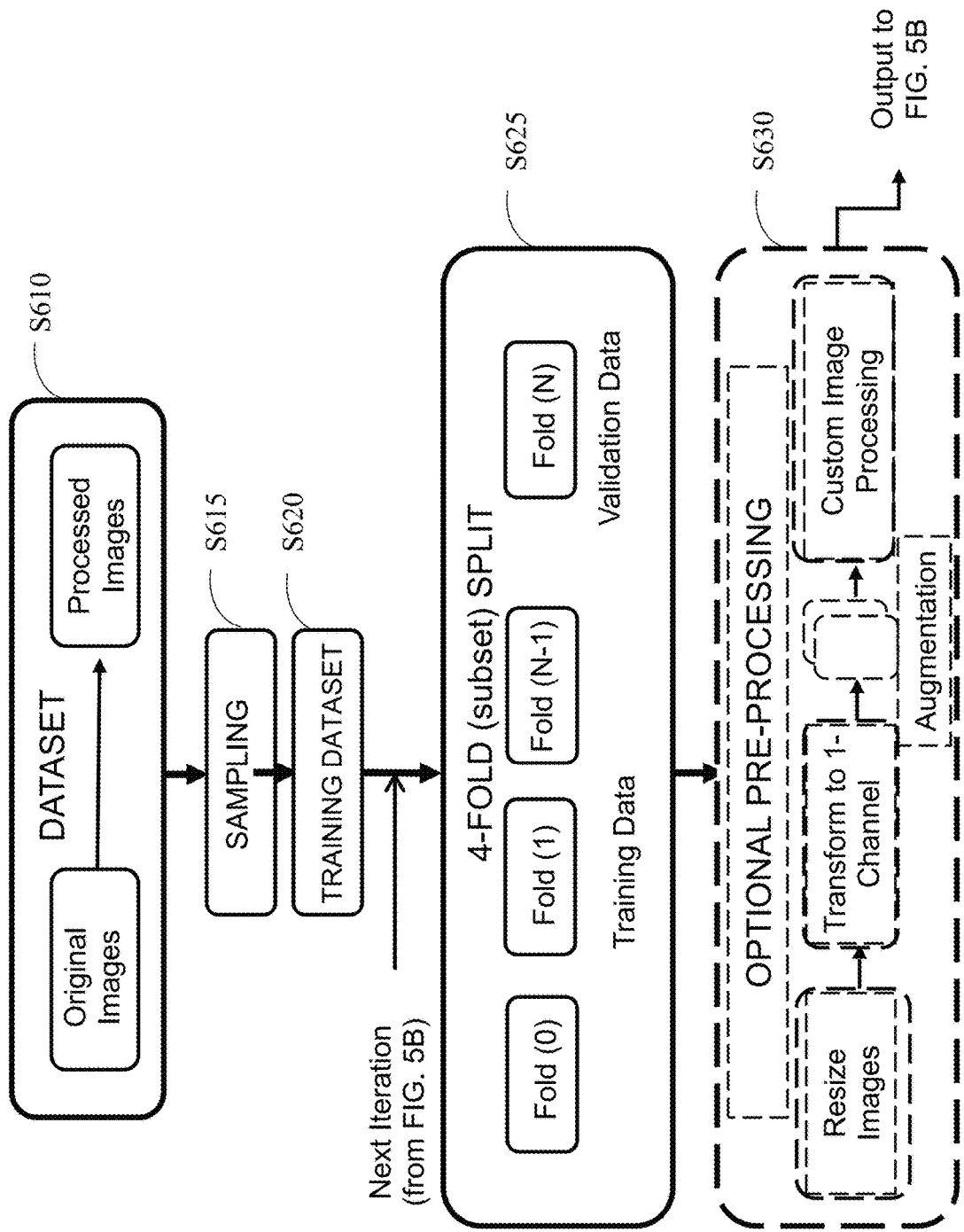
FIGS. 5A and 5B show a flowchart of an embodiment of images used as a training dataset that train the machine learning system to develop the trained models.
Figure 5B:
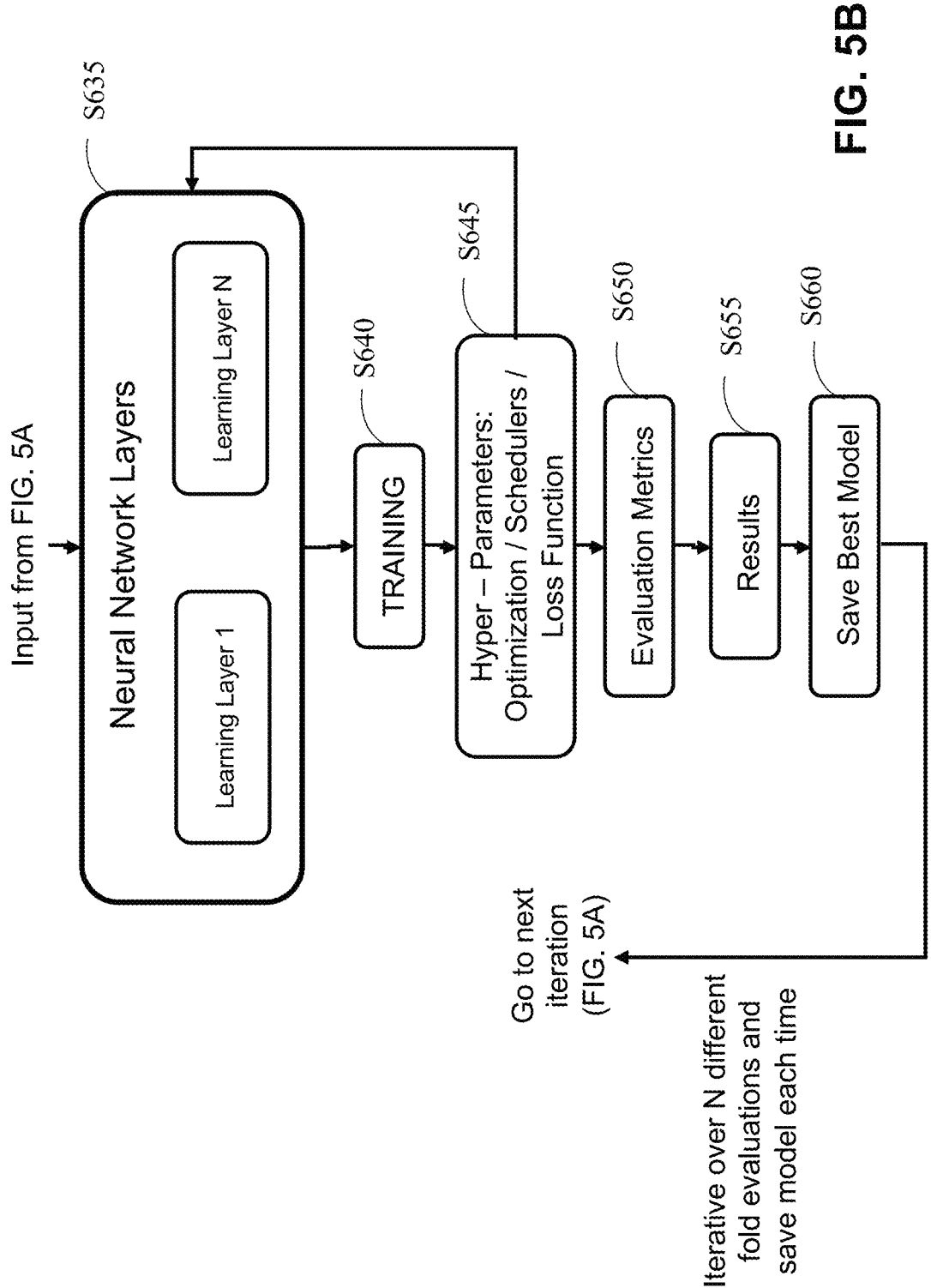

Still referring to FIG. 4, at block S515, a trained neural network of the computing device 425 is configured to provide a plurality of trained models. The neural network computing device 425 is trained using a dataset of training images to provide trained models in order to predict the probability of any of the dental or oral conditions described elsewhere herein in input images (e.g., received from the user). Briefly, the trained neural network, which is discussed in detail with regard to FIGS. 5A-5B, is configured from a customized residual neural network architecture, such as ResNet-34. It will be appreciated that other architectures may be customized and implemented in the present invention, such as, but not limited to: ResNet-18, ResNet-50, DenseNet, ResNext, EfficientNet-b0, EfficientNet-b1, etc. The selected and customized architecture is trained and provides a plurality of trained models at block S525. It will be appreciated that there may be N number models, however, as shown in a non-limiting example, four trained models are used. At block S530, four custom stacked trained models are used to analyze the pre-processed user input images. The analyzing of the user input images at block S535 produces one or both outputs predicting a probability of an oral or dental conditions. In a non-limiting example, a probability of dental caries is output at block S540 and a probability of periodontitis is output at block S545, based on analysis of one or more input images.

FIGS. 5A and 5B show a flowchart of an embodiment of images used as a training dataset that train the machine learning system to provide the trained models. One embodiment of the neural network architecture uses images having a resolution from about 32×32 to about 2048×2048 pixels per inch. Another embodiment uses images having a resolution ranging from about 128×128 to 500×300 pixels per inch. Another embodiment uses images having a rectangular shape resolution, such as, but not limited to, about 350×250 pixels per inch. At block S610, the dataset starts with original labeled images comprising mouth regions having certain conditions or diseases, such as, for example, dental caries and/or periodontitis or any of the conditions described elsewhere herein. In some embodiments, the original images are pre-processed with one or more of the following: noise removal, conversion to an appropriate framework format (e.g., PyTorch®, TensorFlow®, etc.), cropping so that the disease or condition remains, and/or conversion to greyscale. The pre-processed images are then sampled at block S615 to ensure every disease or condition is equally and/or adequately represented to provide the training dataset at block S620. Different sampling techniques may be used, such as, stratified random sampling, weighted random sampling, and/or balanced sampling, to name but a few. In the preferred embodiment of the invention, a customized stratified sampling is used to split the dataset based on desired target values so that the diseases and conditions are equally represented. Advantageously, this reduces the risk of creating unbalanced data, wherein the training model becomes more familiar with high count image category and/or overfits a category by considering similar features repetitively.

The training dataset is then split, or partitioned, into N-number of folds, or subgroups at block S625. Any number of folds can be used to cross validate the training data. For example, 3 to 10 splits may be used. In a non-limiting example, the training data set is split into four folds at block S625 by using a splitting technique, such as, for example, a multi-label stratified shuttle split technique that splits the data based on target label values, which is useful to ensure that at every epoch, there are at least a few sets of images from each category to make the model robust while training. Alternatively, other libraries may be used. In this example, three folds, or subgroups, are used as training data, and one fold is used as validation images. All training folds are iteratively applied and then verified with the validation images to produce a best model. Optional block S630, pre-processes the split dataset of images. Similar to the pre-processing of the user input images, the dataset images may be resized by changing the resolution to provide a preferred resolution and/or converting 3-channel, or RGB (or other color scales may be used as described elsewhere herein), images to 1-channel, or greyscale, images. Greyscale images may also be accepted and processed using the customized neural network architecture, such as by customizing the ResNet-34 architecture. More specifically, the ResNet-34 architecture may be configured to add one or more custom convolution layers, and is discussed further below in reference to FIG. 7. Augmenting the training dataset using custom image processing may also be performed in order to provide additional, enhanced training images to the existing training dataset. Processing a number of images of the training dataset may include one or more of the following custom image processes: introducing noise; adjusting a contrast, brightness, and/or color; introducing a blur, such as a Gaussian blur; sharpening; flipping; rotating; and/or adjusting a white balance, for example. In this manner, the processed images are added to the existing training dataset to provide an augmented training dataset. It will be appreciated that the custom image processing to provide the augmented training images may be performed prior to the training in an offline augmentation process or may be performed dynamically at the time training. The augmented training images may be processed and provided, for example, in the event of insufficient images having certain characteristics, such as lighting, contrast or blurring, in the training dataset.

Referring now to FIG. 5B, the training data is then provided to the neural network layers for training at block S635. Any number of convolutional learning layers may be used for training at block S640, and is discussed further below in reference to FIG. 7. At block S645, the images may be adjusted using various hyper-parameters, such as optimization, schedulers and loss function, during the training to achieve better results, and the adjusted images are fed back into the learning layers for continued training. For example, optimizers may be used that act as an intermediate point between the model and loss function.

A loss function, or error function, calculates the error rate or how far a predicted value is from its true value made in the neural network model. In some embodiments, binary classification loss may be used to predict either of two classes. Entropy is the measure of randomness in the information being processed, and cross entropy is a measure of the difference of the randomness between two random variables. If the divergence of the predicted probability from the actual value increases, the cross-entropy loss increases. In an ideal situation, a perfect model would have a log loss of zero. In an embodiment of the present invention, BCELoss is used for a single class, where BCELoss is defined as the binary cross entropy between the target and the output. In other embodiments, cross-entropy loss can be used for multiple classes, e.g., more than two classes. To measure the loss for multiple classes, a combined BCELoss and Sigmoid layer, i.e., BCEWithLogitsLoss, combines the training into one layer taking advantage of the log-sum-exp trick for numerical stability and for measuring the error of a reconstruction in, for example, an auto-encoder. The target numbers may between 0 and 1, for example. Loss function may also be used to calculate gradients, which may be used to update the weights for each epoch.

An optimizer algorithm may also be used in order to minimize the loss by updating the weight and bias parameters after each epoch. This directs the model to train using smoother gradients and good features, which are defined based on a loss function value, that improves accuracy and/or performance. Examples of optimizer algorithms include, but are not limited to: gradient descent, stochastic gradient descent, and Adam (Adaptive Moment Estimation) optimizers.

Further, scheduler algorithms may also be employed to reduce the learning rate at a specific epoch of each training stage so that the model learns better at each iteration. The training at each epoch may be monitored based on loss. If the loss is not decreased, a scheduler algorithm may be used to reduce the learning rate and improve the learning with different parameters, such as a decay factor. In one such embodiment, a plateau in learning performance is detected, and a scheduler algorithm can be deployed to accelerate the training. For example, a plateau learning rate scheduler is designed with a factor value of about 0.1 to about 0.5 and patience of range between about 5 to about 20. As one example, if the factor value is 0.5 and patience is 5, then the scheduler will reduce the learning rate with a factor of 0.5, if the model loss is not improved after 5 epochs.

Other hyper-parameters that can be used for training include a learning-rate parameter that may range between about 10 to about 10^9. Learning-rate parameters may also range between about 0.001 to about 0.00001. In an embodiment, the learning-rate parameter is about 0.0001. The number of epochs that defines the number of iterations the learning algorithm takes to work through the entire training dataset may range from about 1 to more than 200 iterations. This parameter may be changed based on time and accuracy. Batch-size parameters, which defines how many images are sent simultaneously as input to the model, may also be used and may range from about 4 to a maximum size of the training dataset. For example, the batch size may range from about 16 to about 128. If there is a large set of training images, the batch-size parameter may be limited to numbers like 16, 32, 64, 128, etc. Based on these batch-size parameters, a data loader may fetch specific images and feed them into the model. The data loader may perform this iteratively for the entire training dataset for every epoch and until all epochs are passed. In one embodiment, a batch size parameter is 16. In any of the embodiments herein, accumulation gradient steps may be used to hold batches of images and perform an optimizer algorithm (e.g., by using an optimizer function in Python) to update weight and/or gradient parameters. Large batches with high resolution images give better results in training the model. However, higher end graphical processing units with larger memory, e.g., RAM, are needed to train the model. To achieve optimal training of the model even with standard hardware requirements, the accumulation gradients may be used wherein few batches of input images are held and the weights are updated after processing some batches. In the present invention, the accumulation gradient may range from 2 to a number below the dataset size. In the present invention, the batch size may range from about 1 to a number below the dataset size. For example, accurate processing of 64 images on a standard, or basic, processing unit is possible by using an accumulation gradient of 4 and a batch size of 16. Other examples of accumulation gradients include, but are not limited to: 8, 10, 12, 14, 16, etc. Other methods, such as early stopping, may also be used where training is stopped when the model has stopped learning even after a few epochs. This can be done, for example, by continuous monitoring of loss function values. If the validation loss is not decreased after a defined number of epochs, then the training is terminated. This helps in reducing time and avoids overfitting.

Still referring to FIG. 5B, evaluation metrics are analyzed and reviewed at block S650. Depending on the results at block S655, the best model is saved at block S660. The best model may be selected based on one or more parameters including, but not limited to, loss and accuracy. The training continues by returning to block S625 to train and validate on the next N-number of folds, until all the training folds have been cycled through. In the example shown in FIGS. 5A and 5B, the 4-fold process results in 4 trained models. The 4 trained models are then used to evaluate and predict the probability of diseases and/or conditions present in the input images.

FIG. 6 illustrates a mathematical equation that may be used in the neural network system for processing any of the input images to generate the desired output features. As shown, the following definitions correspond to the input: N is the number of images; $C_{in}$ is the number of channels in an image; $H_{in}$ is the input height; and $W_{in}$ is input width. The following definitions correspond to the output: N is the number of images; $C_{out}$ is the output channel; $H_{out}$ is the output height; and $W_{out}$ is the output width. In one embodiment, $H_{in}$ is 32, $W_{in}$ and kernel size are 5 with default padding as 0, dilation 1, and stride as 1. Processing the input image using this equation may output a 28×28 ($H_{out} \times W_{out}$) image. In this example, $C_{out}$ is 1 (i.e., greyscale). The input resolution may be changed or selected depending on the desired output data and other requirements.

Figure 7:
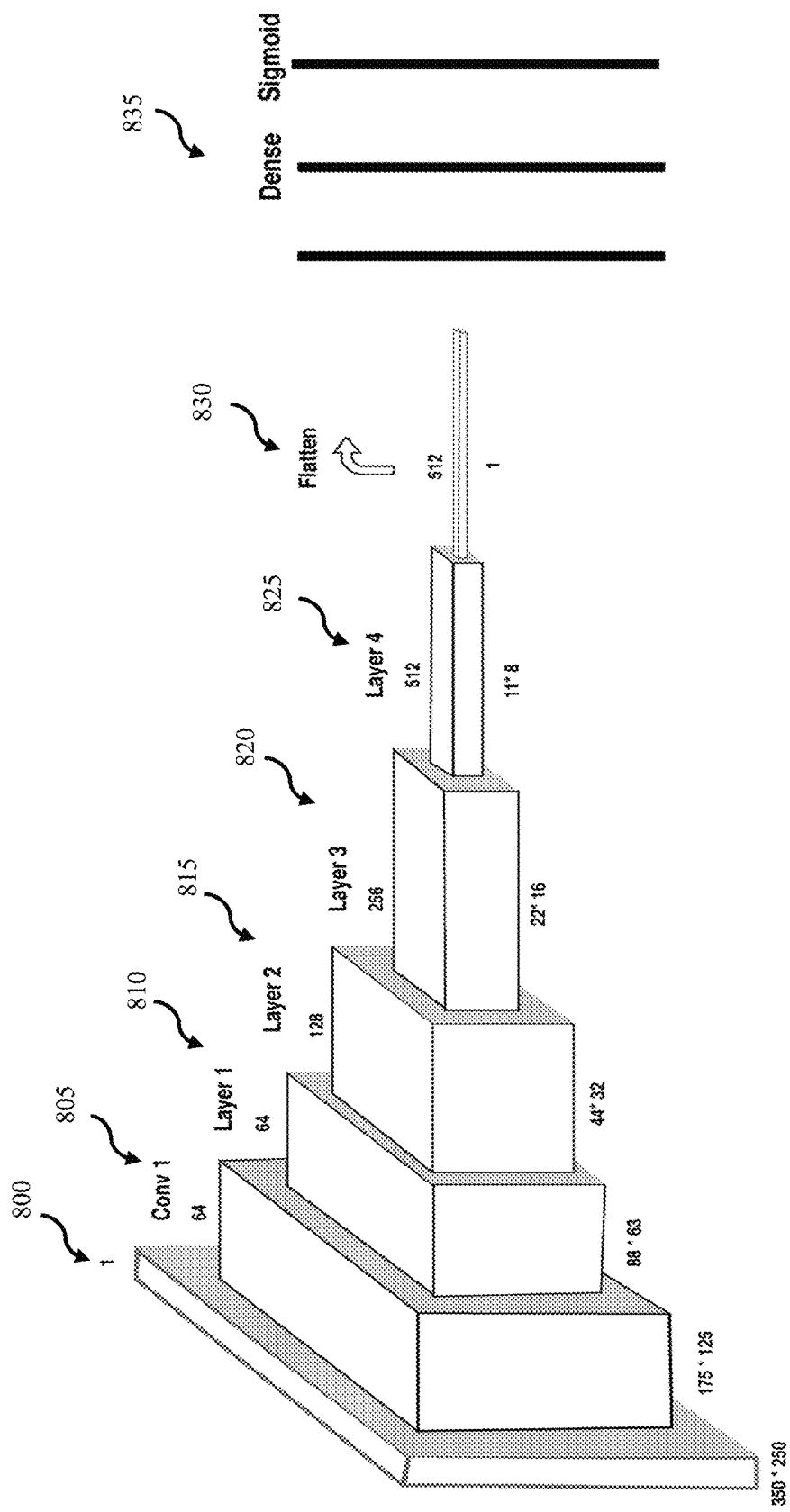
FIG. 7 illustrates one embodiment of the convolutional learning layers of the neural network.
Figure 8B:
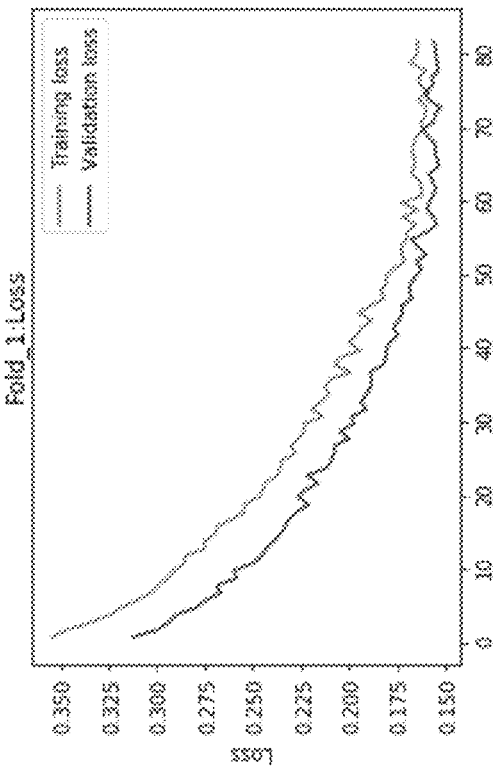
FIGS. 8A-8D illustrate plots showing an example of a loss function value and accuracy for the training and validation data at each fold.
Figure 8D:
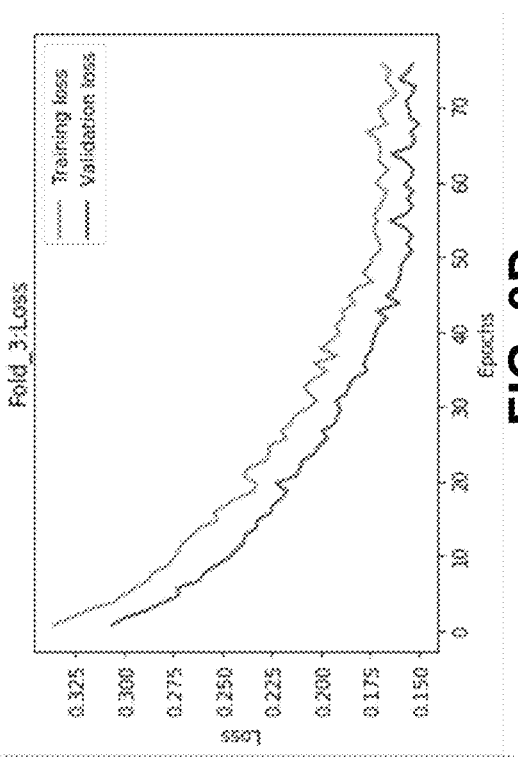
Figure 8A:
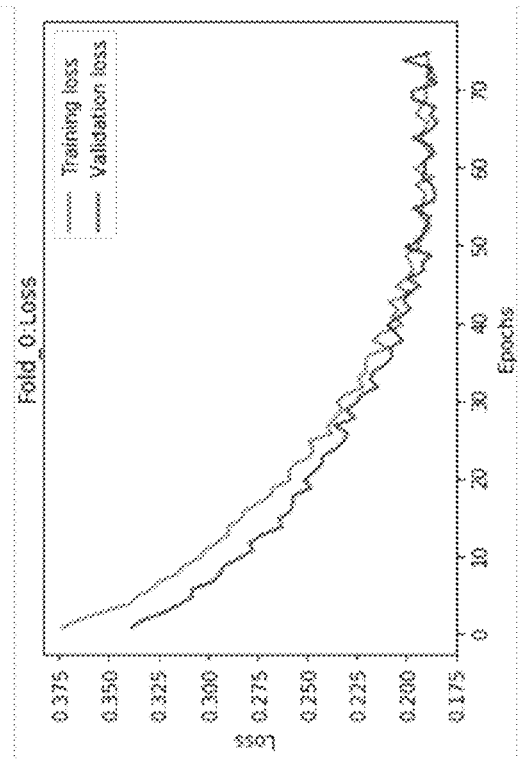
Figure 8C:
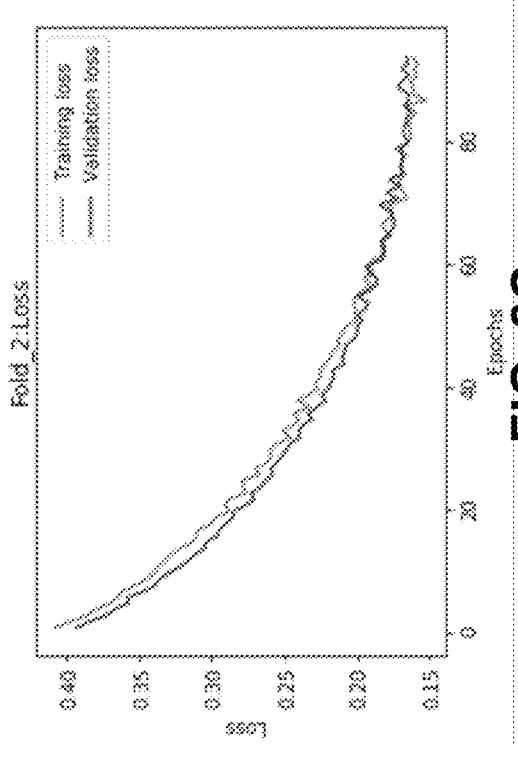

FIG. 7 illustrates one embodiment of the convolutional learning layers of the computing device 425. The computing device is initially provided images shown at 805 with a resolution of about 350×250 pixels per inch, number of images is 1 and channel is 1, using ResNet-34 and common values for padding and stride as follows: padding is 3, and stride is 2, with a kernel size of 7. Calculating the first convolutional learning layer 805 using the above equation and values provides an $H_{out}$ of 125, a $W_{out}$ of 175, and 64 channels. This output is then provided to layer 1 810 and processed using a kernel size of 3, padding as 1, and stride as 2 to output $H_{out}$ of 88, a $W_{out}$ of 63, and 64 channels. At layer 2 815, the output is $H_{out}$ of 44, a $W_{out}$ of 32, and 128 channels. Similarly, the output features pass through all layers 815, 820, and 825, to generate useful features, which may be of a height and width dimension, including, but not limited to: 44×32, 22×16, and 11×8. A next layer 830 in the system may be an activation function that may use a rectified linear unit. This layer returns 0, if the input is negative, otherwise, it returns the original value. It can be stated as f(x)=max(0,x). It may be used in non-linearities and interaction effects. The next layers 835 may be a pooling layer used to reduce the size of the image to a single column by considering only important features from the feature map. This may be used to reduce overfitting by reducing the bias towards specific features. A max pooling algorithm may be used that takes the maximum values from the image at that kernel position and moves through the feature map. Similarly, other pooling algorithms including, but not limited to, average pooling that uses an average value of pixels rather than the maximum value, may also be used. A final dense layer may be a fully connected layer that takes the flattened input image and performs all necessary computations and provides the output to the Sigmoid output layer. The learning layers then output a probability of the specific clinical condition, e.g., dental caries, periodontitis, gingivitis, fillings, toothbrush abrasion, dental erosion, teeth sensitivity, oral cancer, cracked or broken teeth, mouth sores, halitosis, abscess, congenital tooth conditions, (including but not limited to: anodontia, hyperdontia, hypodontia, microdontia, macrodontia, cleft lip/palate), tongue disease, one or more cosmetic conditions, (including but not limited to: missing teeth, teeth discoloration, crooked teeth, etc. The probability is then used for calculating the oral health rating score.

FIGS. 8A-8D illustrate plots showing an example of a loss function value and accuracy for the training and validation data at each fold. The losses and accuracies are saved and plotted from each epoch of the corresponding folds. As shown, the differences are plotted between the training loss and the validation accuracy based on the number of epochs. The variation seen in the four plots are due to the use of the 4-fold method, which uses a different training dataset at each fold. It will be appreciated that an early stopping function may be used to stop the training process. Early stopping may monitor the loss or accuracy value and stop the training process after some number of epochs, if the model is not learning adequately. Early stopping may also be used to avoid overfitting and/or to reduce training time. Early stopping value(s) may be used as a hyper-parameter in the training process. Similarly, FIGS. 9A-9D illustrate plots showing an example of an accuracy for the training and validation at each fold.

Figure 10B:
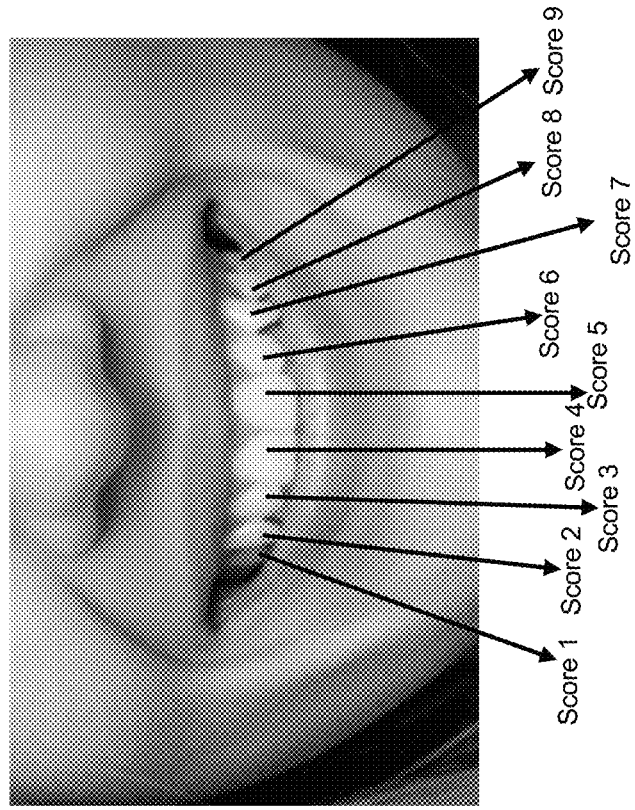
FIGS. 10A and 10B illustrate a user input and output image, respectively, of the machine-learning computing device showing a score, or rating, for each tooth.
Figure 10A:
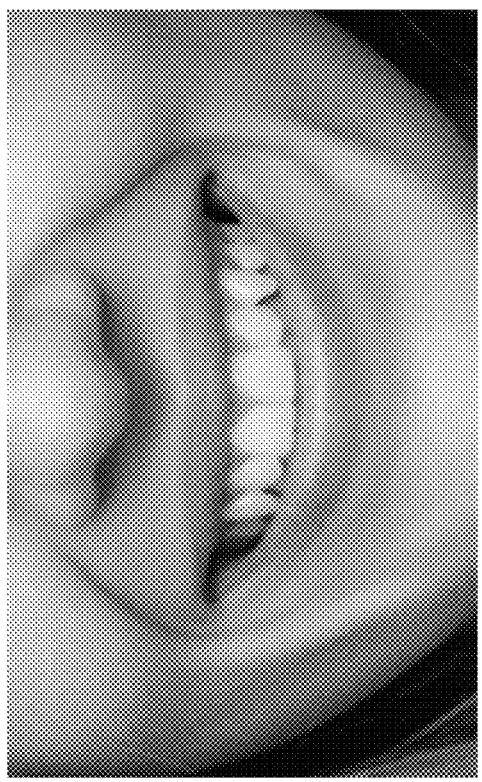

FIGS. 10A and 10B illustrate a user input and output image, respectively, of the machine-learning computing device showing a score, or rating, for each tooth. User input image shown in FIG. 10A is uploaded to the computing device 425. The image is pre-processed as discussed with reference to FIG. 4, at block S510, and provided to the trained neural network. The custom stacked models are used to analyze and predict the probability of presence and/or absence of an oral or dental condition. The computing device 425 is then configured to provide an output to the user illustrating the score for each identified individual tooth. For example, one tooth has a score 1, tooth 2 has a score 2, etc. It will be appreciated that the scoring can be configured in any manner, such as, for example, a higher score indicates a better health rating.

Figure 11A:
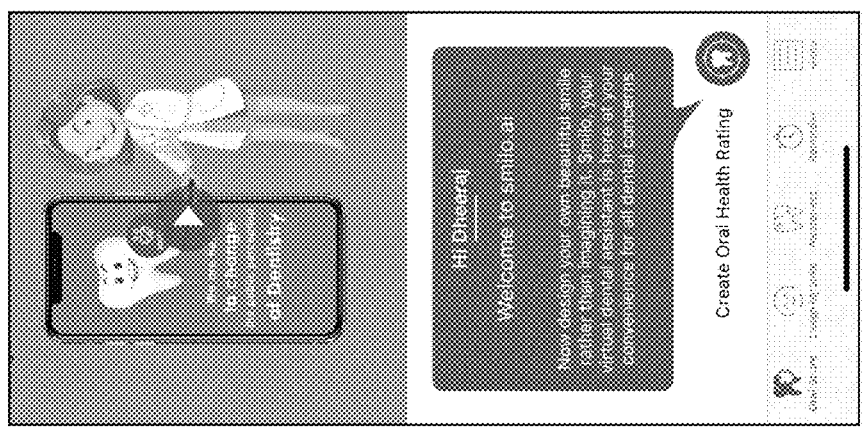
FIGS. 11A-11Z illustrate various example screenshots of an example user that may be used in conjunction with a user's mobile device.
Figure 11B:
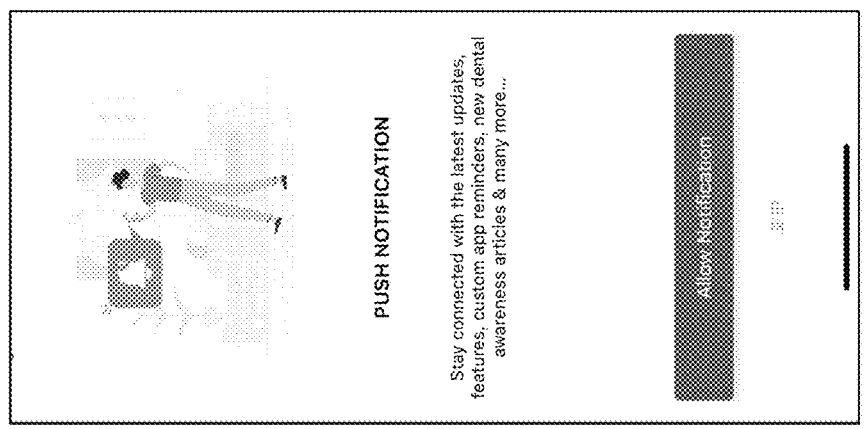
Figure 11C:
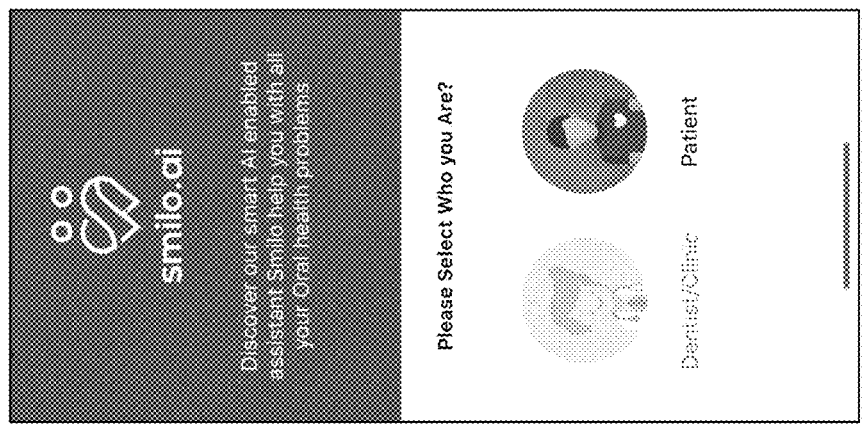
Figure 11D:
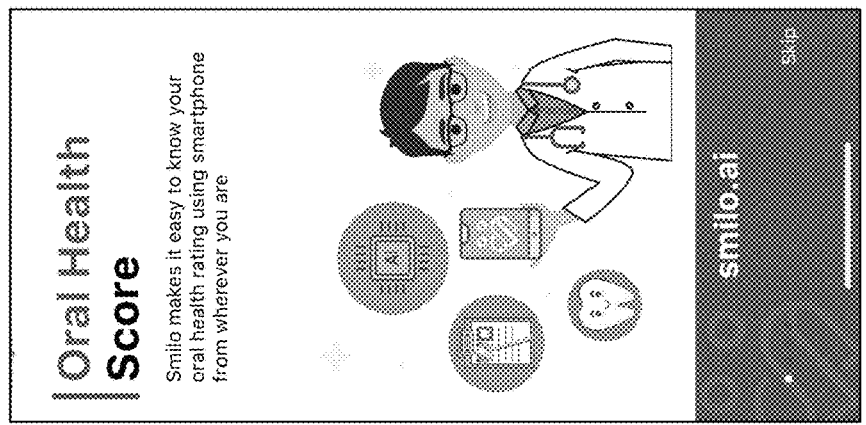
Figures 11E, 11F, 11G, 11H:
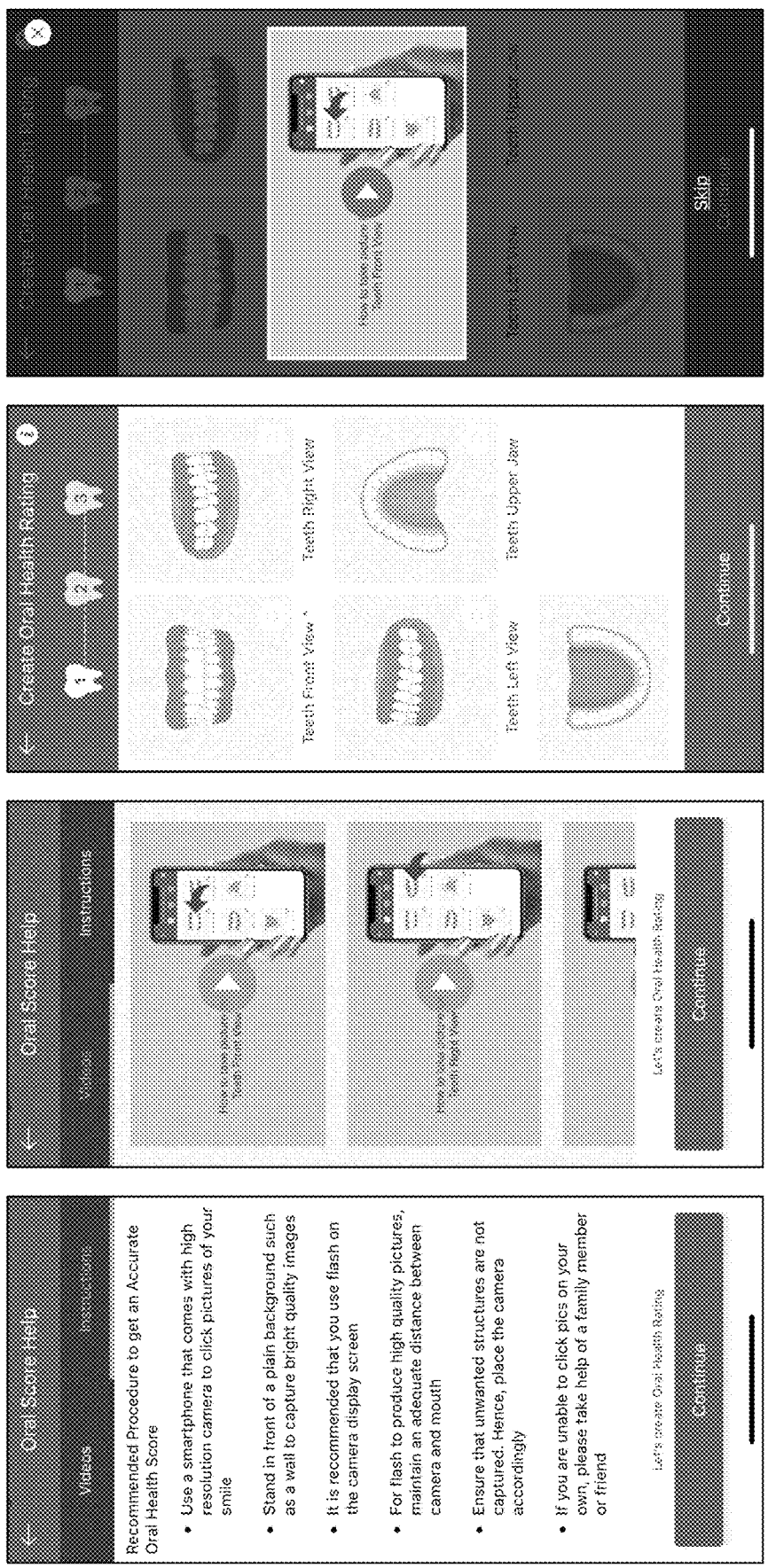
Figures 11I, 11J, 11K, 11L:
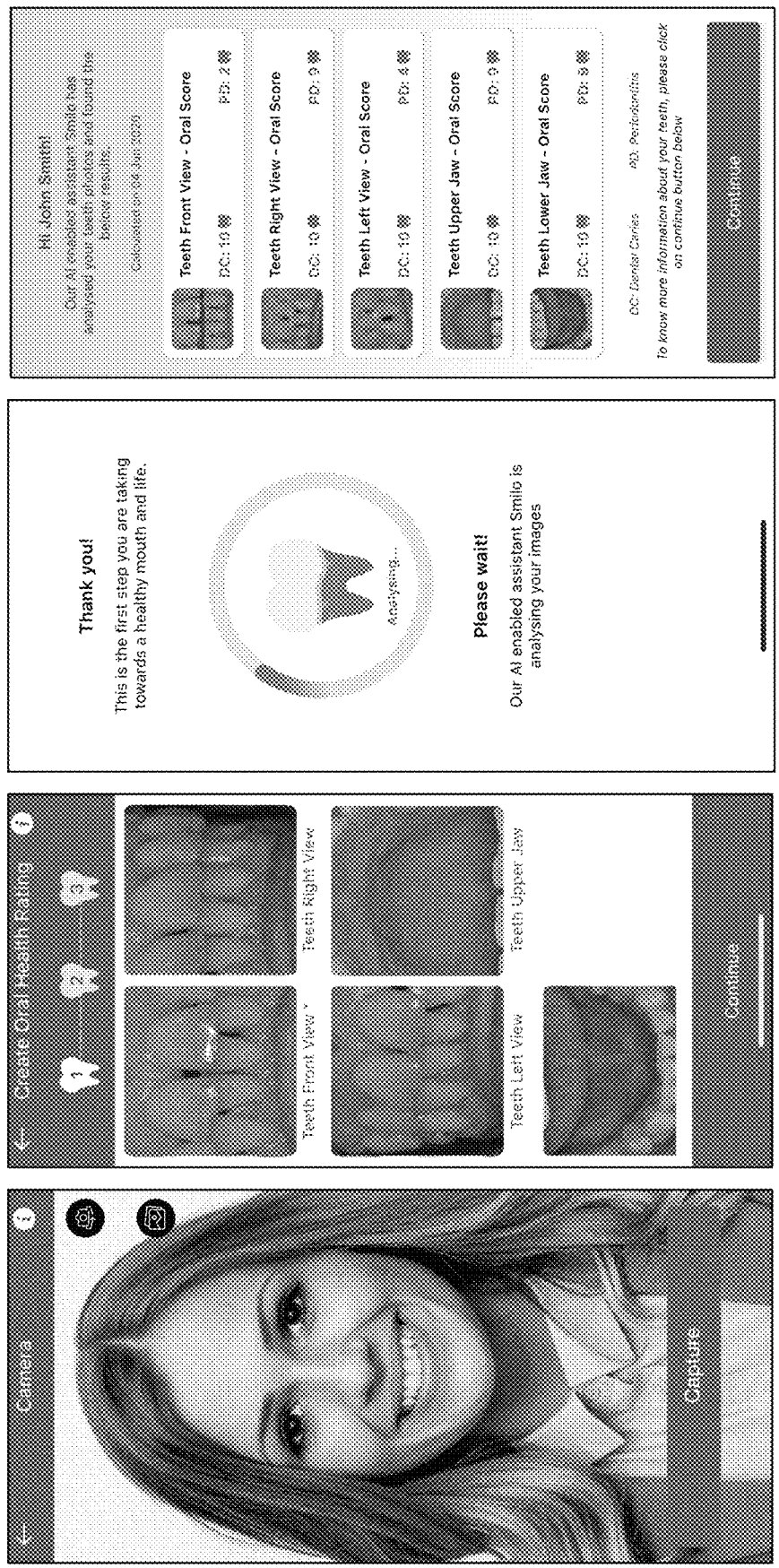
Figure 11M:
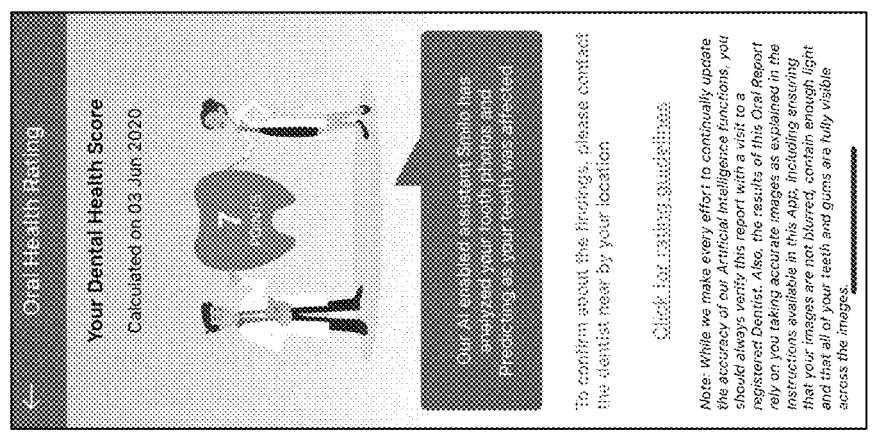
Figure 11N:
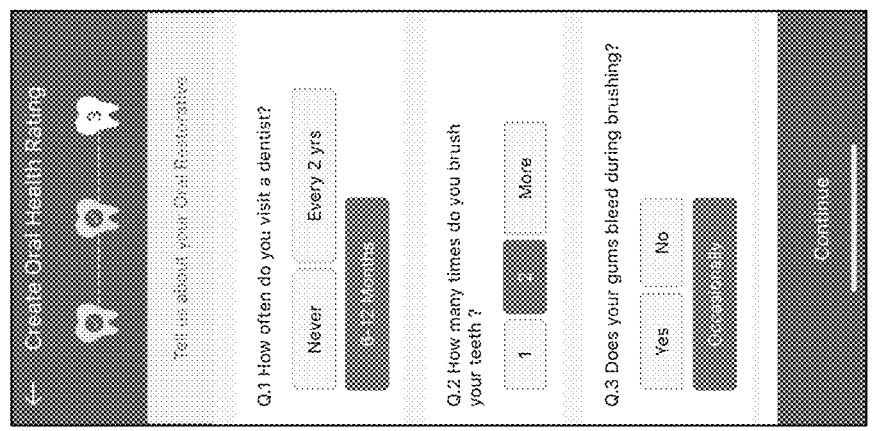
Figure 11O:
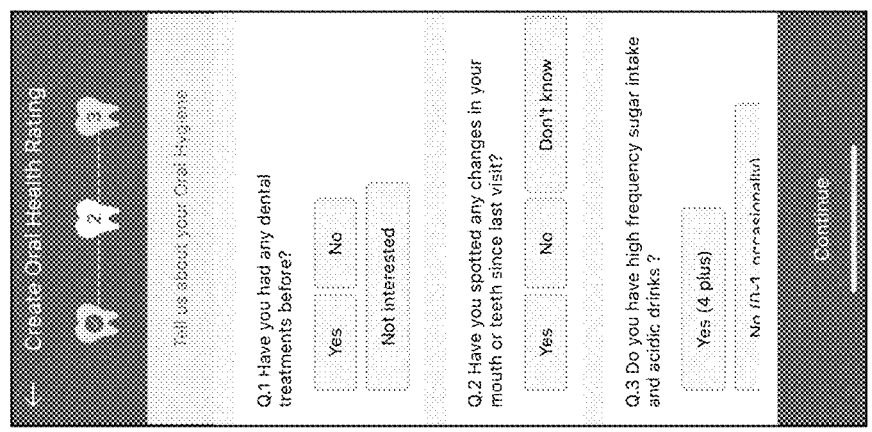
Figure 11P:
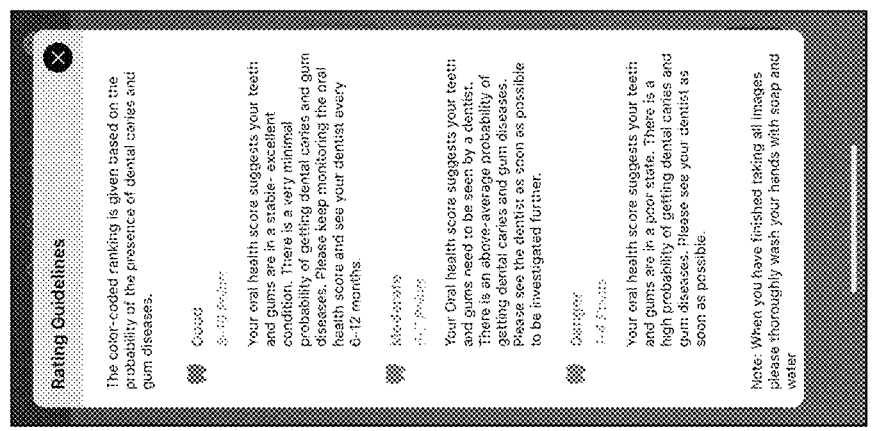
Figure 11Q:
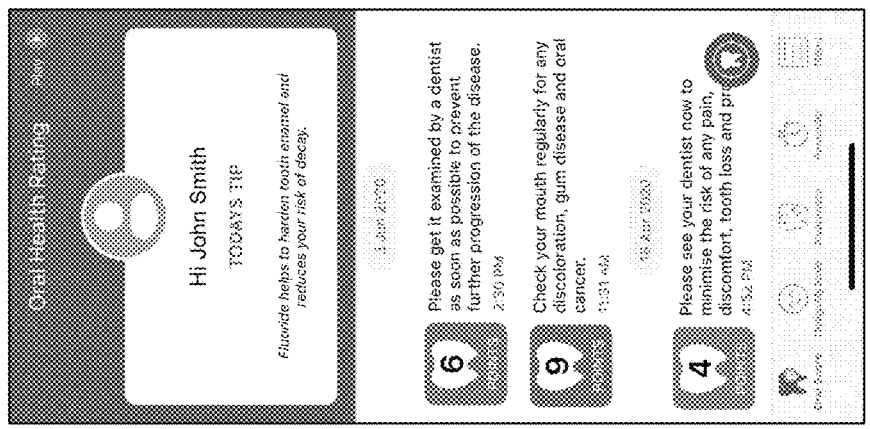
Figure 11R:
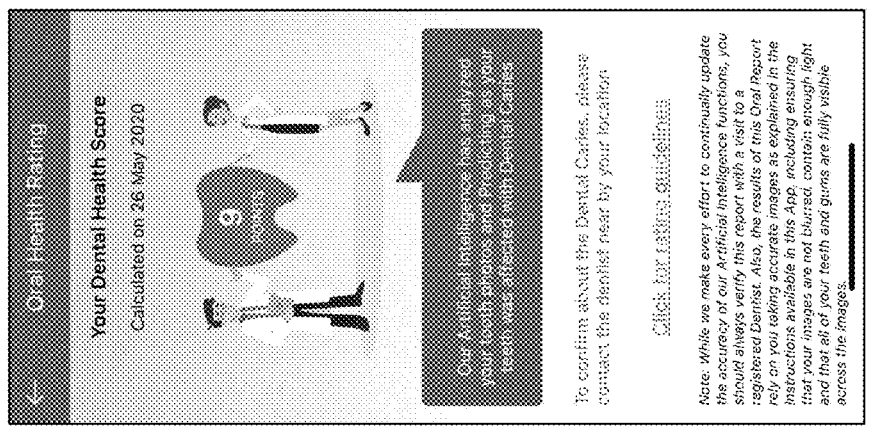
Figure 11S:
Figure 11T:
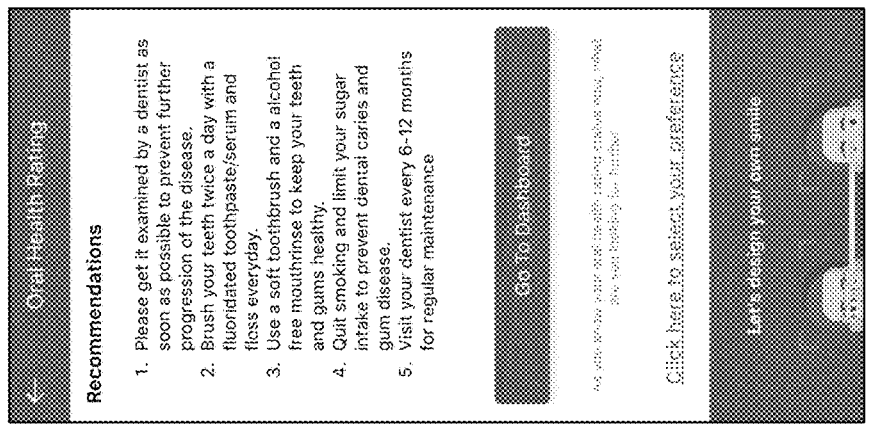
Figures 11U, 11V, 11W, 11X:
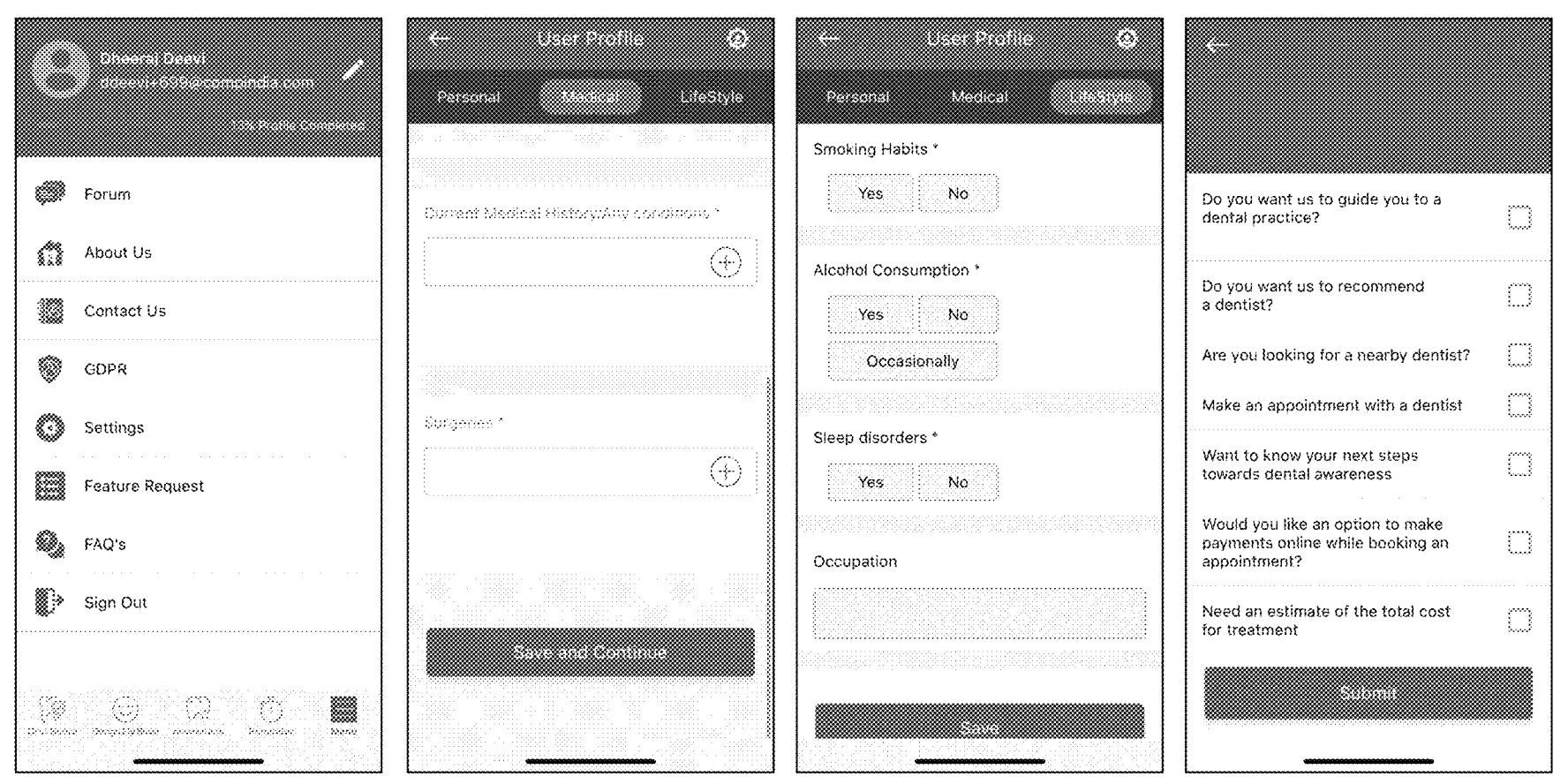
Figures 11Y, 11Z:
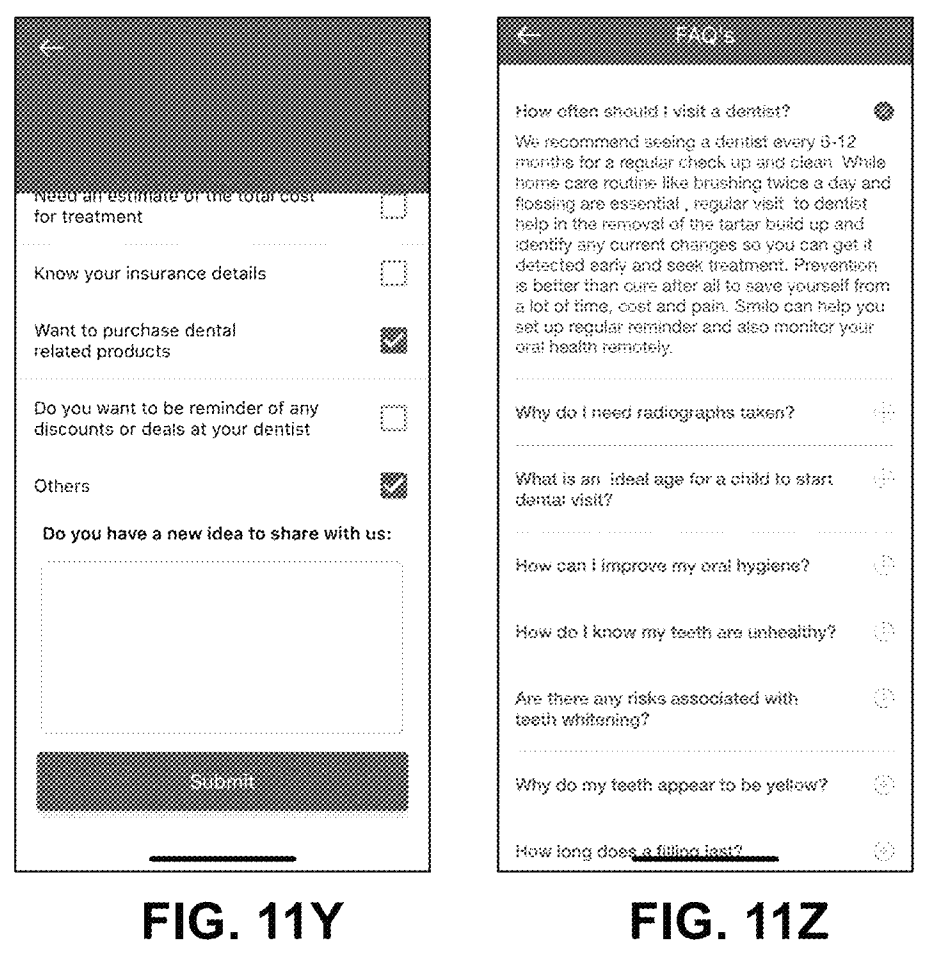

FIGS. 11A-Z illustrate various example screenshots of an example user that may be used in conjunction with a user's computing device (e.g., mobile device, wearable, etc.). FIG. 11A is an example screenshot of on oral health score software application where a user launches the software application. FIG. 11B is an example screenshot allowing the user to select their role (as in block S220 of FIG. 2) while using the software application. For example, the software is configured to present an option that a doctor, dentist, clinician, or patient would select (block S225 of FIG. 2) and an option that a patient may select (block S230 of FIG. 2). FIG. 11C is an example screenshot asking the user's preference regarding notifications and updates. FIG. 11D is an example of the oral health rating screenshot that welcomes the user. As shown in FIG. 11E, the application is configured to provide instructions to the user on recommended procedures on how to position the camera, set the resolution, set the flash, etc., in order to take an adequate image for processing. FIG. 11F shows the user various videos and instructions to further inform the user on recommended procedures and practices. FIG. 11G is an example screenshot configured to present a number of various teeth images, for example, a teeth front view, a teeth right view, a teeth left view, a teeth upper jaw, and a teeth lower jaw. Each view is configured with a camera icon for the user to select which view they are planning to capture. FIG. 11H provides the user a video and/or written instructions on the best practices to capture, for example, a teeth front view image. FIG. 11I is an example screenshot of a teeth front view that is captured by the application. The application is configured to activate a camera of the mobile device and a user may position his/her, or another's, face within the borders (e.g., as described in FIGS. 1-2). For example, the application may be configured to provide guidelines, frames, points, geometric shapes, or combinations thereof, to assist the user in capturing accurate and clear images of the various teeth regions. As previously mentioned, images may also be taken or selected from an image gallery, library, or database. FIG. 11J is an example screenshot showing the various input images corresponding the teeth view. FIG. 11K shows an example screenshot of a notification presented to the user that the software application is analyzing the received input image. As shown in FIG. 11L, after analyzing the uploaded input images, the oral score is returned to the user providing an oral score for each of the input images. FIG. 11M show an example screenshot providing the user with a ranking based on the probability of the presence and/or absence of an oral or dental condition. For example, rankings could be from good to worse and the reasons suggesting that ranking. FIGS. 11N-11O are example screenshots of the application configured to present the user with questions that may be answered. The answers may or may not contribute to an overall dental health score, as shown in FIGS. 11P and 11S. Further, FIGS. 11Q and 11R are example screenshots of the application configured to present the user with dental recommendations. FIG. 11T is another example screenshot of the application configured to present the user with information specific to each tooth score.

FIGS. 11U-11W are example screenshots of a user's profile that can be edited and updated for reference (e.g., as shown and/or described in connection with FIG. 3). For example, the user's personal information (FIG. 11U), medical information (FIG. 11V), and lifestyle information (FIG. 11W) may be entered into the software application. FIGS. 11X-11Z are example screenshots asking the user questions related to oral health, such as recommendations of dental practices, making appointments, paying bills, or cost estimates, as well as insurance information. FIG. 11Q is an example screenshot of frequently asked questions that the user may read for reference.

It will be appreciated that the present invention can be used for various reasons, such as customizing their smile, receiving oral health information, or visualizing oral rating scores for each individual tooth and/or gum region. Advantageously, the software application provides the oral health score automatically without the need for the user to visit a dentist.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

Various embodiments will now be described.

One aspect of the present disclosure is directed to a system for analyzing an input image of a mouth region from a user to provide information regarding a disease or condition of the mouth region. In some embodiments, the system includes: a computing device configured to receive one or more input images from a user; a trained machine learning system comprising trained models.

In any one of the preceding embodiments, the models are trained using a dataset of training images, such that the dataset is partitioned into a first subset of training images and a second subset of validation images.

In any one of the preceding embodiments, the dataset includes one or both of: a dental caries feature and a periodontitis feature.

In any one of the preceding embodiments, the trained machine learning system is further configured to: receive the one or more input images from the computing device; pre-process the one or more input images to extract features of each of the one or more input images; analyze the extracted features using the trained models to produce a prediction based on a recognized feature within each of the one or more input images; and generate an oral health score for each of the one or more input images corresponding to the recognized feature associated with one or both of the dental caries feature and the periodontitis feature.

In any one of the preceding embodiments, the computing device is configured to transmit the oral health score to the remote user.

In any one of the preceding embodiments, the dataset includes images having one or more of: a resolution of about 32×32 to about 2048×2048; a greyscale; and a rectangular shape.

In any one of the preceding embodiments, each image of the dataset is cropped to provide a cropped image having one or both of: the dental caries feature and the periodontitis feature.

In any one of the preceding embodiments, the models are trained to recognize both of the dental caries feature and the periodontitis feature.

In any one of the preceding embodiments, the models are trained to recognize the dental caries feature.

In any one of the preceding embodiments, the models are trained to recognize the periodontitis feature.

In any one of the preceding embodiments, the machine learning system further processes one or more of the images of the dataset to provide additional images for the dataset. In any one of the preceding embodiments, the processes performed on the subset comprise one or more of: adding noise, adjusting a contrast, adjusting a brightness, blurring, sharpening, flipping, rotating, adjusting a white balance, adjusting a color, or equivalents thereof In any one of the preceding embodiments, the processes may be performed dynamically at a time of training.

In any one of the preceding embodiments, pre-processing the one or more input images to extract features further comprises one or more of: adjusting a resolution of each of the one or more input images; or converting each of the one or more input images into a greyscale image.

In any one of the preceding embodiments, each of the trained models are stacked to provide the prediction.

In any one of the preceding embodiments, the system further includes a user interface configured for interaction with the user using one or both of: an application residing on a smartphone or a website associated with the computing device In any one of the preceding embodiments, the user interface is configured for interaction with the user by providing visual aids to assist the user in capturing the one or more images of the mouth region.

In any one of the preceding embodiments, the visual aids include one or more of: frames, lines, points, geometric shapes, or combinations and equivalents thereof, in order to align, angle, or distance the digital camera to different areas inside the mouth region.

In any one of the preceding embodiments, each of the one or more input images is of a different area in the mouth region.

In any one of the preceding embodiments, the oral health score comprises a score for each individual tooth and gum region for each input image.

In any one of the preceding embodiments, the oral health score comprises a score for each individual tooth for each input image.

In any one of the preceding embodiments, the oral health score comprises a score for each gum region for each input image.

Another aspect of the present disclosure is directed to a method for analyzing an input image of a mouth region from a user to provide information regarding a disease or condition of the mouth region. In any one of the preceding embodiments, the method includes: receiving, at a computing device, one or more input images from a user. In any one of the preceding embodiments, the method includes: at a trained machine learning system comprising trained models: receiving the one or more input images from the computing device; pre-processing the one or more input images to extract features of each of the one or more input images; analyzing the extracted features using the trained models to produce a prediction based on a recognized feature within each of the one or more input images; and generating an oral health score for each of the one or more input images corresponding to the recognized feature associated with one or both of the dental caries feature and the periodontitis feature.

In any one of the preceding embodiments, the models are trained using a dataset of training images.

In any one of the preceding embodiments, the dataset is partitioned into a first subset of training images and a second subset of validation images.

In any one of the preceding embodiments, the dataset includes one or both of: a dental caries feature and a periodontitis feature.

In any one of the preceding embodiments, the computing device is configured to transmit the oral health score to the remote user.

In any one of the preceding embodiments, wherein the dataset are images having one or more of: a resolution of about 32×32 to about 2048×2048; a greyscale; and a rectangular shape.

In any one of the preceding embodiments, the method further includes processing a subset of the dataset to provide additional images for the dataset by one or more of: adding noise, adjusting a contrast, adjusting a brightness, blurring, sharpening, flipping, rotating, adjusting a white balance, adjusting a color, or equivalents thereof.

In any one of the preceding embodiments, the processes may be performed dynamically at a time of training.

In any one of the preceding embodiments, pre-processing the one or more input images further includes converting the one or more input images from a 3-channel image to a 1-channel image.

In any one of the preceding embodiments, pre-processing the one or more input images further includes adjusting a resolution to resize the one or more input images.

In any one of the preceding embodiments, the method further includes providing, from the computing device to the user, visual aids in order to capture the one or more images.

In any one of the preceding embodiments, the visual aids include one or more of: frames, lines, points, geometric shapes, or combinations and equivalents thereof, in order to align, angle, or distance the digital camera to different areas inside the mouth region.

Another aspect of the present disclosure is directed to a method for training a machine learning system for analyzing an input image to provide information regarding a disease or condition. In some embodiments, the method includes: receiving a dataset of training images, the dataset of training images comprising a mouth region having one or both of: a dental caries feature and a periodontitis feature; partitioning the dataset into one or more subsets; receiving a user input image of a user mouth region, such that the user input image is a 3-channel image; converting the 3-channel image into a 1-channel image to provide a greyscale user input image; and analyzing the user mouth region of the greyscale user input image using the trained models to provide a prediction of a presence or an absence of the dental caries feature or the periodontitis feature.

In any one of the preceding embodiments, a number of trained models is equal to the number of subsets.

In any one of the preceding embodiments, one subset is used as validation images for each of the remaining subsets of training images, to provide one or more trained models.

In any one of the preceding embodiments, the method further includes processing the dataset to provide additional images for the dataset by one or more of: adding noise, adjusting a contrast, adjusting a brightness, blurring, sharpening, flipping, rotating, adjusting a white balance, adjusting a color, or equivalents thereof.

In any one of the preceding embodiments, each training image of the dataset includes parameters of one or more of: a resolution of about 32×32 to about 2048×2048; a greyscale, and a rectangular shape.

In any one of the preceding embodiments, the method further includes stacking each of the trained models to provide the prediction.

In any one of the preceding embodiments, the method further includes cropping each training image of the dataset to provide a cropped image having one or both of the dental caries feature and the periodontitis feature.

In any one of the preceding embodiments, the models are trained to recognize both of the dental caries feature and the periodontitis feature.

In any one of the preceding embodiments, the models are trained to recognize the dental caries feature.

In any one of the preceding embodiments, the models are trained to recognize the periodontitis feature.

Another aspect of the present disclosure is directed to a system for analyzing an input image of a mouth region from a user to provide information regarding a disease or condition of the mouth region. The system includes: a computing device configured to receive one or more input images from a user; and a trained machine learning system comprising trained models, wherein the models are trained using a dataset of training images, wherein the dataset is partitioned into a first subset of training images and a second subset of validation images, the dataset comprising one or more dental features or oral features.

In any of the preceding embodiments, the trained machine learning system further configured to: receive the one or more input images from the computing device; pre-process the one or more input images to extract features of each of the one or more input images; analyze the extracted features using the trained models to produce a prediction based on a recognized feature within each of the one or more input images; and generate an oral health score for each of the one or more input images corresponding to the recognized feature associated with one or both of: the dental feature and the oral features.

In any of the preceding embodiments, the oral health score comprises an indication of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, tongue disease, and one or more cosmetic conditions.

Another aspect of the present disclosure is directed to a method for analyzing an input image of a mouth region from a user to provide information regarding a disease or condition of the mouth region. The method includes: receiving, at a computing device, one or more input images from a user; at a trained machine learning system comprising trained models, wherein the models are trained using a dataset of training images, wherein the dataset is partitioned into a first subset of training images and a second subset of validation images, and wherein the dataset comprises one or both of: a dental feature and an oral feature: receiving the one or more input images from the computing device; pre-processing the one or more input images to extract features of each of the one or more input images; analyzing the extracted features using the trained models to produce a prediction based on a recognized feature within each of the one or more input images; and generating an oral health score for each of the one or more input images corresponding to the recognized feature associated with one or both of the dental feature and the oral feature.

In any of the preceding embodiments, the oral health score comprises an indication of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, tongue disease, and one or more cosmetic conditions.

Another aspect of the present disclosure is directed to a method for training a machine learning system for analyzing an input image to provide information regarding a disease or condition. The method includes: receiving a dataset of training images, the dataset of training images comprising a mouth region having one or both of: a dental feature and an oral feature; partitioning the dataset into one or more subsets, wherein one subset is used as validation images for each of the remaining subsets of training images, to provide one or more trained models; receiving a user input image of a user mouth region, wherein the user input image is a 3-channel image; converting the 3-channel image into a 1-channel image to provide a greyscale user input image; and analyzing the user mouth region of the greyscale user input image using the trained models to provide a prediction of a presence or an absence of one or both of: the dental feature or the oral feature.

In any of the preceding embodiments, the oral health score comprises an indication of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, tongue disease, and one or more cosmetic conditions.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for analyzing a mouth region to determine a disease or condition of the mouth region, the system comprising:
   a trained machine learning system comprising at least one processor and trained models, wherein the models are trained using a dataset of training images, wherein the dataset is partitioned into a first subset of training images and a second subset of validation images, the dataset comprising one or both of: a dental caries feature and a periodontitis feature, the trained machine learning system further configured to:
   receive one or more images of the mouth region;
   pre-process the one or more images to extract image features;
   analyze the extracted image features to generate a prediction based on a recognized feature within each of the one or more images; and
   generate an oral health score for each of the one or more images corresponding to the recognized feature associated with one or both of: the dental caries feature and the periodontitis feature.

2. The system of claim 1, wherein the dataset comprises images having one or more of: a resolution of about 32×32 to about 2048×2048; a greyscale; and a rectangular shape.

3. The system of claim 1, wherein each image of the dataset is cropped to provide a cropped image having one or both of: the dental caries feature and the periodontitis feature.

4. The system of claim 3, wherein the models are trained to recognize both the dental caries feature and the periodontitis feature.

5. The system of claim 1, wherein the machine learning system further processes one or more of the images of the dataset to provide additional images for the dataset, and the processes performed on the subset comprise one or more of: adding noise, adjusting a contrast, adjusting a brightness, blurring, sharpening, flipping, rotating, adjusting a white balance, adjusting a color, or equivalents thereof.

6. The system of claim 5, wherein the processes may be performed dynamically at a time of training.

7. The system of claim 1, wherein pre-processing the one or more images to extract image features further comprises one or more of: adjusting a resolution of each of the one or more images; or converting each of the one or more images into a greyscale image.

8. The system of claim 1, wherein each of the trained models are stacked to provide the prediction.

9. The system of claim 1, further comprising a user interface configured for interaction with a user using one or both of: an application residing on a smartphone or a website associated with a computing device.

10. The system of claim 9, wherein the user interface is configured for interaction with a user by providing visual aids to assist the user in capturing the one or more images of the mouth region.

11. The system of claim 10, wherein the visual aids include one or more of: frames, lines, points, geometric shapes, or combinations and equivalents thereof, in order to align, angle, or distance of an image sensor to different areas inside the mouth region.

12. The system of claim 1, wherein each of the one or more images is of a different area in the mouth region.

13. The system of claim 1, wherein the oral health score comprises a score for each individual tooth for each input of the one or more images.

14. The system of claim 1, wherein the oral health score comprises a score for each gum region for each of the one or more images.

15. The system of claim 1, wherein the oral health score comprises a score for each individual tooth and gum region for each of the one or more images.

16. The system of claim 1, wherein the processor is configured to transmit the oral health score to a user.

17. The system of claim 1, wherein the oral health score comprises an indication of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, tongue disease, and one or more cosmetic conditions.

18. A method for analyzing a mouth region to provide information regarding a disease or condition of the mouth region, the method comprising:
   at a trained machine learning system comprising at least one processor and trained models, wherein the models are trained using a dataset of training images, wherein the dataset is partitioned into a first subset of training images and a second subset of validation images, and wherein the dataset comprises one or both of: a dental caries feature and a periodontitis feature:
   receiving one or more images;
   pre-processing the one or more images to extract image features;
   analyzing the extracted image features to generate a prediction based on a recognized feature within each of the one or more images; and
   generating an oral health score for each of the one or more images corresponding to the recognized feature associated with one or both of the dental caries feature and the periodontitis feature.

19. The method of claim 18, wherein the dataset are images having one or more of: a resolution of about 32×32 to about 2048×2048; a greyscale; and a rectangular shape.

20. The method of claim 18, further comprising processing a subset of the dataset to provide additional images for the dataset by one or more of: adding noise, adjusting a contrast, adjusting a brightness, blurring, sharpening, flipping, rotating, adjusting a white balance, adjusting a color, or equivalents thereof.

21. The method of claim 20, wherein the processes may be performed dynamically at a time of training.

22. The method of claim 18, wherein pre-processing the one or more images further comprises converting the one or more images from a 3-channel image to a 1-channel image.

23. The method of claim 18, wherein pre-processing the one or more input-images further comprises adjusting a resolution to resize the one or more images.

24. The method of claim 18, further comprising outputting, from the processor, visual aids in order to capture the one or more images.

25. The method of claim 24, wherein the visual aids comprise one or more of: frames, lines, points, geometric shapes, or combinations and equivalents thereof, in order to align, angle, or distance of an image sensor to different areas inside the mouth region.

26. The method of claim 18, further comprising transmitting, using the processor, the oral health score to a user.

27. The method of claim 18, wherein the oral health score comprises an indication of one or more of: dental caries, periodontitis, gingivitis, fillings, toothbrush abrasion, dental erosion, teeth sensitivity, oral cancer, cracked or broken teeth, mouth sores, halitosis, abscess, congenital tooth conditions, tongue disease, and one or more cosmetic conditions.

* * * * *